United States Patent [19]

Togashi et al.

[11] Patent Number: 5,418,653
[45] Date of Patent: May 23, 1995

[54] MAGNETIC REPRODUCING APPARATUS AND MAGNETIC RECORDING AND REPRODUCING APPARATUS WITH EDITING FUNCTION

[75] Inventors: Sigekazu Togashi, Katano; Kunjo Suesada, Ikoma; Kunio Sekimoto, Katano; Yoshinobu Oba, Atsugi; Tadashi Nakayama, Machida, all of Japan

[73] Assignees: Matsushita Electric Industrial Co., Ltd., Osaka; Nippon Hoso Kyokai, Tokyo, both of Japan

[21] Appl. No.: 215,705

[22] Filed: Mar. 22, 1994

Related U.S. Application Data

[62] Division of Ser. No. 636,697, Jan. 2, 1991, Pat. No. 5,327,295.

[30] Foreign Application Priority Data

Jan. 9, 1990 [JP] Japan ................................ 2-001770

[51] Int. Cl.⁶ .................... G11B 27/02; G11B 15/14
[52] U.S. Cl. .................................... 360/13; 360/64
[58] Field of Search ................ 360/13, 64; 358/311

[56] References Cited

U.S. PATENT DOCUMENTS

| | | | |
|---|---|---|---|
| 4,507,691 | 3/1985 | Ishiguro et al. | 360/14.3 |
| 4,520,405 | 5/1985 | Sasaki et al. | 360/14.1 |
| 5,023,731 | 6/1991 | Morisaki | 360/64 |

FOREIGN PATENT DOCUMENTS

| | | |
|---|---|---|
| 0225733A1 | 6/1987 | European Pat. Off. . |
| 0240217 | 10/1987 | European Pat. Off. . |
| 3445467 | 10/1985 | Germany . |

OTHER PUBLICATIONS

Design Consideration for the D-2 NTSC Composite DVTR, By Richard Brush, SMPTE Journal, Mar. 1988, pp. 182-193.

*Primary Examiner*—Aristotelis Psitos
*Assistant Examiner*—Won Tae C. Kim
*Attorney, Agent, or Firm*—Stevens, Davis, Miller & Mosher

[57] ABSTRACT

A recording apparatus of the present invention includes selective guard adding means for predicting, at the time of editing, positions of adjacency of new tracks to previously recorded tracks obtained at the time of completion of new track recording, and adds, at the time of editing, guards to locations where disturbance due to residue of erasing of the same azimuth might occur in order to remove or reduce the disturbance due to residue of erasing of the same azimuth caused at the editing point. When performing reproduction from a recording medium whereon tracks recorded by heads of at least two kinds of azimuth angles are disposed alternately and a plurality of tracks are handled as one recording unit and recorded, a reproducing apparatus of the present invention is so configured that the center of each of heads located at both ends of reproducing heads may be shifted to the inside as compared with each corresponding recording track. When disturbance due to the residue of erasing of the same azimuth occurs at the editing point, therefore, more signals of tracks to be originally reproduced can be reproduced, resulting in a greater resistance to disturbance of the same azimuth.

2 Claims, 18 Drawing Sheets

DIRECTION OF CYLINDER ROTATION

DIRECTION OF HEAD ROTATION

← DIRECTION OF CYLINDER ROTATION

← DIRECTION OF HEAD ROTATION

← DIRECTION OF CYLINDER ROTATION

← DIRECTION OF HEAD ROTATION

DIRECTION OF CYLINDER ROTATION

DIRECTION OF HEAD ROTATION

DIRECTION OF CYLINDER ROTATION

DIRECTION OF HEAD ROTATION

DIRECTION OF CYLINDER ROTATION

DIRECTION OF HEAD ROTATION

DIRECTION OF CYLINDER ROTATION

DIRECTION OF HEAD ROTATION

MAGNETIC REPRODUCING APPARATUS AND MAGNETIC RECORDING AND REPRODUCING APPARATUS WITH EDITING FUNCTION

This is a division of application Ser. No. 07/636,697, filed Jan. 2, 1991 now U.S. Pat. No. 5,327,295.

BACKGROUND OF THE INVENTION

1. Field of the Invention

The present invention relates to a recording apparatus for recording video signals and audio signals onto magnetic tape and having editing function of performing assemble editing and insert editing on magnetic tape having signals thus recorded thereon and a reproducing apparatus for reproducing signals from the magnetic tape which has undergone editing function in the recording apparatus.

2. Description of the Prior Art

In recent years, the D-1 format and D-2 format are standardized by the SMPTE for digital VTR's free from degraduation in picture quality and audio quality caused by dubbing. Further, high definition VTR's for recording high-resolution television signals have also been put into practical use. In these digital VTR's and high definition VTR's, a very large number of amount of information must be recorded and high recording density is demanded from the viewpoint of tape consumption, resulting in narrower track pitches (such as 39.1 $\mu$m in D-2).

In conventional analog VTR's for broadcast requiring editing function such as VTR's of M2 format or C2 format, it is important to secure the reliability of editing points and a guard is provided between helical tracks. Further, in digital VTR's of D-2 format (as described in "Design Consideration for the D-2 NTSC Composite DVTR" by Richard Brush, SMPTE journal, March 1988), disturbance caused by adjacent tracks is reduced by using a combination of azimuth recording and the Miller$^2$ channel code. This reduction of disturbance caused by adjacent tracks is owing to the fact that high-frequency components are attenuated by the azimuth effect for crosstalk signals from adjacent tracks and the low frequency energy contained in signals so recorded by means of Miller$^2$ channel codes as to limit the run length range to 3 data bit cells or less is very little. From these facts, the above described paper says that drift off track of a head by as much as $\pm 20$ $\mu$m or less is in a range wherein correction using an ECC (error-correction coding system) can be performed.

However, this is nothing but a margin for disagreement between a recorded track and the locus of a reproducing head caused when a normally recorded tape is reproduced by another machine. As is well known, track linearities of VTR's differ somewhat with apparatuses. Further, expansion and contraction of tape and/or a servo tracking deviation may be caused with changes in environment. As a result of deviation between a recorded track and the trajectory of a recording head at the time of editing generated by these factors, partial residue of an original recording track which should ideally disappear may be sometimes caused at the editing point in addition to reduction in track width of a track which should be left. Reliability at the editing point must be considered with due regard to these facts.

Assuming now that the tape pattern has a format of a conventional digital VTR using azimuth recording and having no guards between tracks, degradation of the reproduced signal at the editing point will now be described by referring to FIGS. 19A and 19B. In some formats of conventional digital VTR's, audio sectors are disposed at the beginning and the end of helical tracks. For brevity of description, however, the track angle is disregarded and only video sectors are illustrated in FIGS. 19A and 19B. For the same reason, the recording head width is made equal to the track pitch $W_p$. These figures show a tape pattern obtained when insert editing is performed in a state of tracking deviation (tracking error) and the tape runs from the right to the left. FIGS. 19A and 19B show the tape pattern obtained when an inserted tape pattern (hereafter simply referred to as insert pattern) deviates respectively on the delayed side (i.e., the illustrated right side) and on the advanced side (i.e., the illustrated left side) by $W_e$ with respect to the original tape pattern (hereafter simply referred to as original pattern). PBa and PBb respectively denote positions wherein respective tracks are traced by a wide-width reproduction head having azimuth a and a wide-width reproduction head having azimuth b in the tracking state at the time of recording the original pattern. (Hereafter, tape pattern diagrams are shown in similar forms unless otherwise specified.) When the insert pattern deviates on the delayed side (lag side) by $W_e$ as shown in FIG. 19A, residue of erasing of the original pattern having the same azimuth as that of the leading track of the insert pattern (hereafter referred to simply as residue of the same azimuth) is generated by an amount corresponding to $W_e$ immediately before the in-point as evident from the Figure and the residue is mixed into the reproduction head PBa as disturbance at the time of reproduction. (This phenomenon is hereafter referred to at disturbance of the same azimuth.) Further, as this time, a track width of the original pattern corresponding to the same $W_e$ is shaved at the out point. When the insert pattern is deviated on the advanced side (lead side) (FIG. 19B), a track width of the original pattern immediately before the in-point corresponding to the same $W_e$ is shaved and disturbance due to the residue of the same azimuth corresponding to $W_e$ is caused at the out-point.

When editing is performed in a tape pattern having no guards of the prior art, disturbance due to residue of the same azimuth and reduction in the track width are thus caused. Especially, disturbance due to the residue of the same azimuth corresponds, in case of digital VTR's to degradation in reproduced signal which is 1.5 to 3 times that caused by reduction in track width. IN the case of analog VTR's, disturbance due to the residue of the same azimuth corresponds to degradation in reproduced signal which is several ten times that caused by reduction in track width. (Hereafter, this ratio is referred to as disturbance coefficient of the same azimuth.) A great problem is thus caused.

Further, in case guards are provided as in conventional analog VTR's for broadcast, the track width of all tracks including tracks other than the editing point is largely reduced as compared with the track pitch in the resultant tape format. The disturbance due to the residue of the same azimuth and reduction in the track width as described above pose a great problem in narrow track recording of VGT's needing high-density recording such as high-definition VTR's or digital VTR's.

SUMMARY OF THE INVENTION

A first object of the present invention is to realize a recording apparatus having a tape format capable of reducing or preventing the disturbance caused by residue of erasing of the same azimuth at the editing point without reducing the track width excepting the vicinity of the editing point.

A second object of the present invention is to realize a reproducing apparatus having such a reproducing head arrangement that degradation of a reproduced signal at the editing point is suppressed to the minimum when edited tape is reproduced.

In order to attain the first object, a magnetic recording apparatus of the present invention comprises track arrangement determining means for determining the arrangement of signals to be newly recorded on a recording medium, guard position determining means for, in recording tracks on the basis of the result of the determination made by the track arrangement determining means, predicting positions of adjacency of new tracks to previously recorded tracks and determining positions of guards to be added to prevent residue of erasing of the same azimuth, and guard adding means for adding guards on the basis of the result of the determination made by the guard position determining means, and the magnetic recording apparatus is so configured that guards may be selectively added.

In the above described configuration, on the basis of arrangement of newly recorded signals on a recording medium determined by the track arrangement determining means, prediction of positions wherein new tracks are adjacent to previously recorded tracks and determination of positions of guards to be added to prevent residue of erasing of the same azimuth are made by the guard position determining means, and then guards are selectively added by the guard adding means. Disturbance due to residue of erasing of the same azimuth caused by tracking deviation at the time of editing is lightened by the guards, and it becomes possible to avoid disposition of guards excepting locations before and behind new tracks or new paired tracks adjacent to old tracks previously recorded and reduction in the track width in the normal recording section can be prevented.

In order to attain the second object in a reproducing apparatus of the present invention, an apparatus for reproducing recorded magnetic recording patterns including tracks recorded by heads to at least two kinds of azimuth angles and disposed alternately and recording unit tracks so formed that a plurality of tracks in the track width direction may be handled as one recording unit as the time of recording is so configured that the center of each of reproducing heads located at both ends of reproducing heads for reproducing signals recorded on tracks of the recording unit tracks at the time of reproduction may be shifted to the inside of recording tracks as compared with the center of respective recording tracks.

Owing to the configuration heretofore described, the head reproduction region of each reproducting head pair is shifted to the inside with respect to the recording track pattern. As for the track of azimuth wherein the residue of erasing of the same azimuth has occurred, a recording track newly recorded deviates to the inside of paired heads and a reproducing head shifts to the inside of paired heads. A larger amount of track which should be originally reproduced can thus be reproduced, resulting in a greater resistance to disturbance caused by residue of erasing of the same azimuth.

DESCRIPTION OF THE PREFERRED EMBODIMENTS

Embodiments of the present invention will hereafter be described. In the ensuring description of the embodiments, it is assumed that a digital VTR comprising tape wound over 180 degrees and recording heads and reproducing heads with two kinds of azimuth, i.e., azimuth a and azimuth b is used unless otherwise stated.

Figure 1:
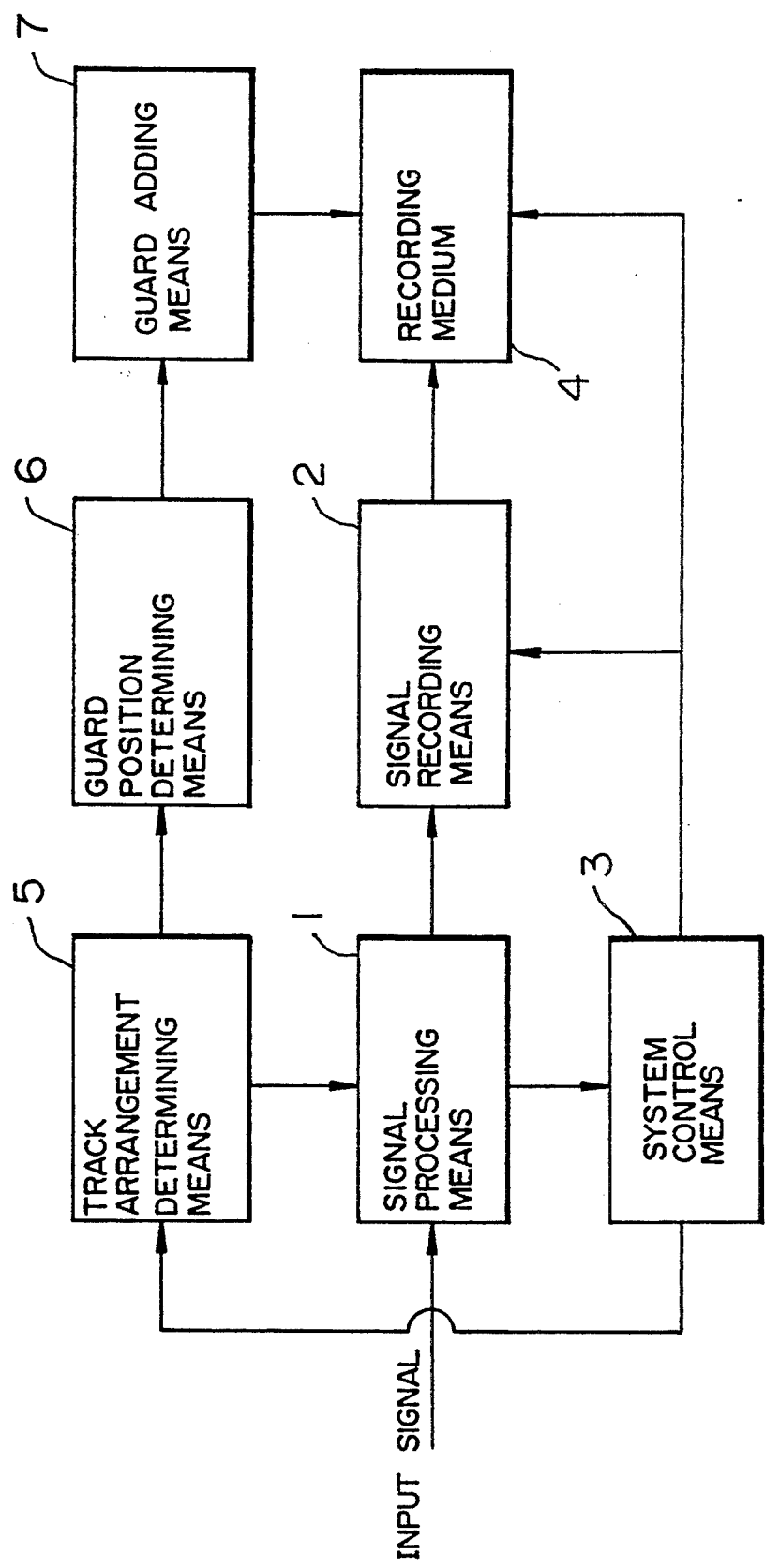
FIG. 1 is a configuration diagram showing a first embodiment of the present invention.

A first embodiment of the present invention will hereafter be described by referring to FIGS. 1, 2 and 3. In case editing is performed near the same editing point only once, the present embodiment aims at lightening (reducing) the disturbance caused by residue to erasing of the same azimuth without reducing the track width except in the vicinity of the editing point.

Figure 2A:
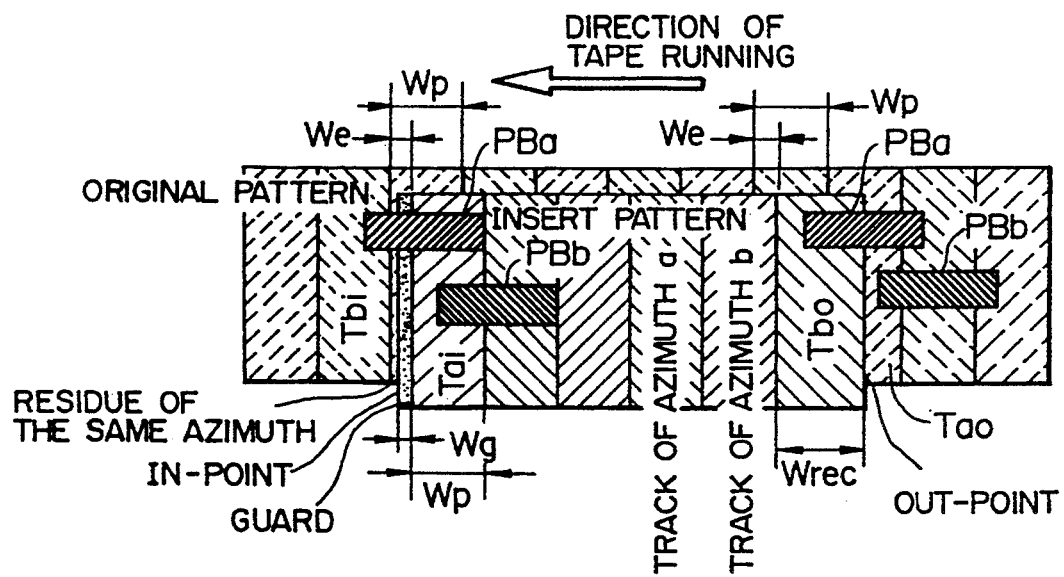
FIGS. 2A and 2B show tape pattern diagrams of the first embodiment.
Figure 2B:
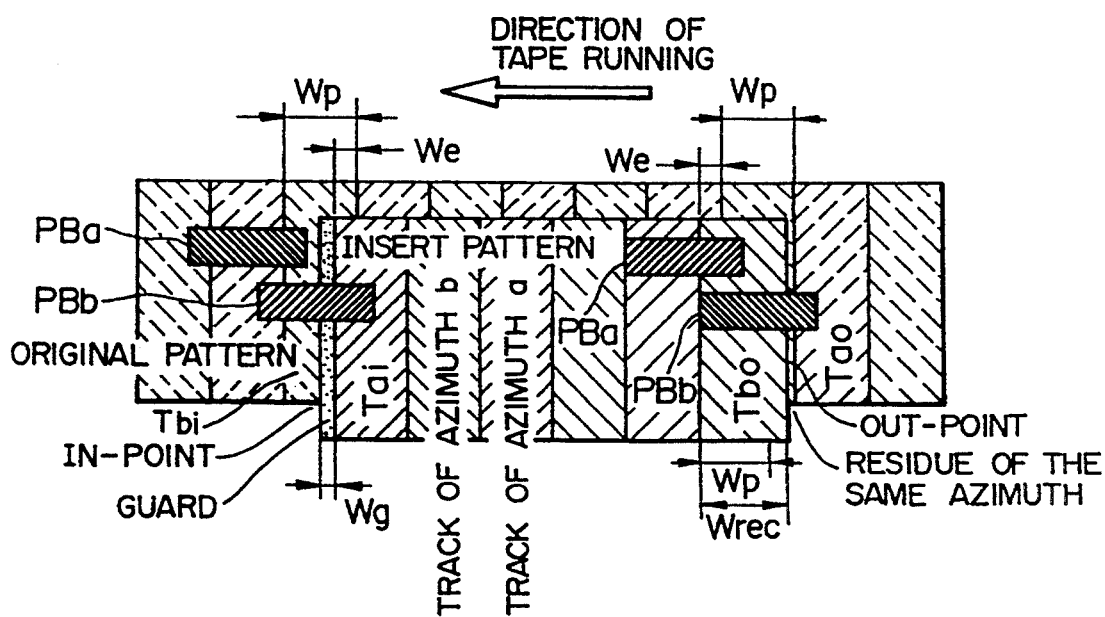
Figure 3A:
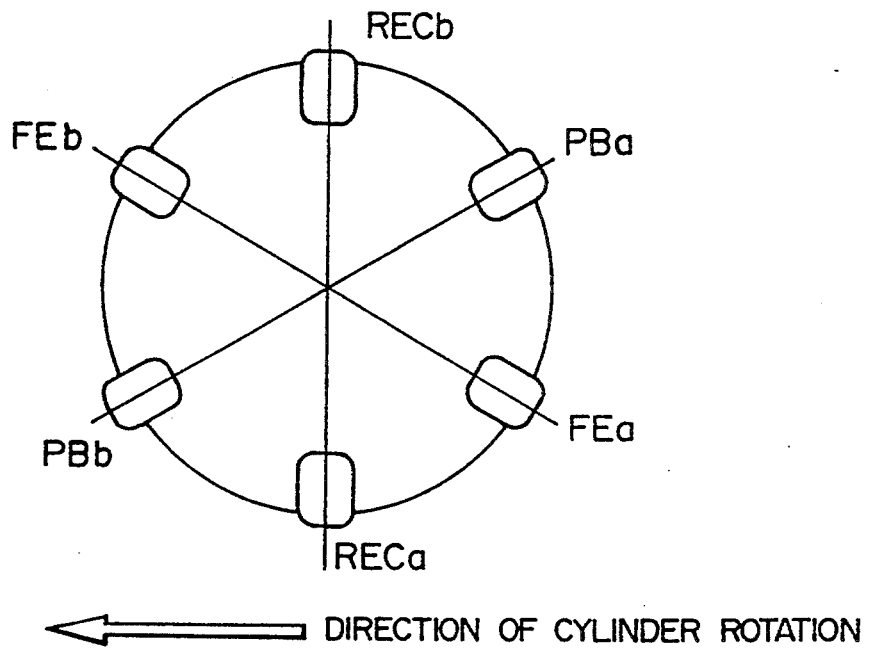
FIGS. 3A and 3B show head mounting diagrams in the first embodiment.
Figure 3B:
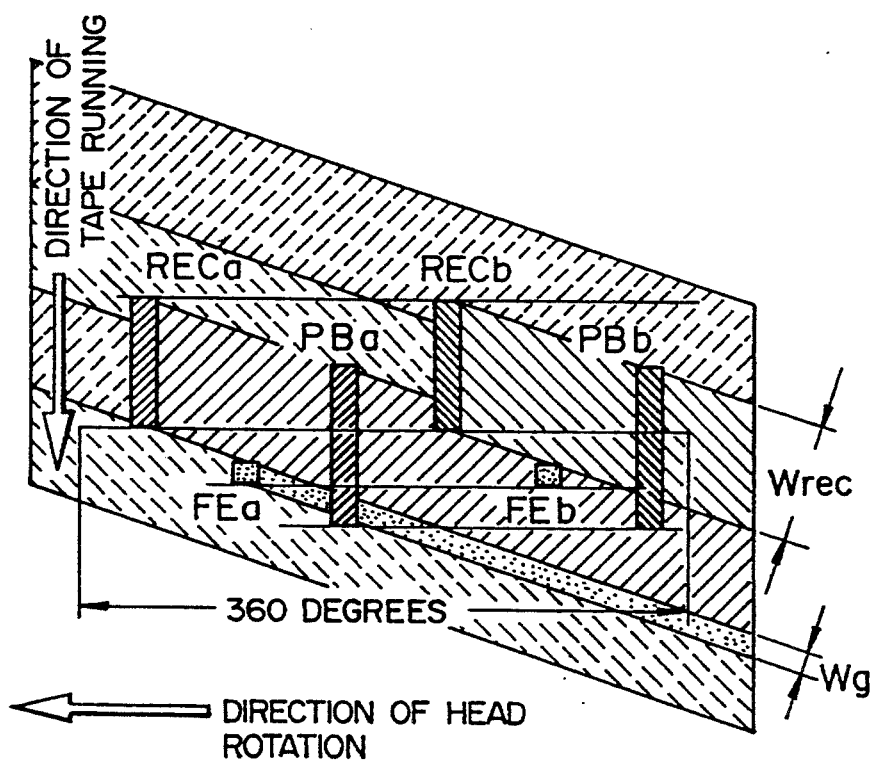

FIG. 1 is a block diagram showing the configuration of a first embodiment of the present invention. FIG. 2 is a tape pattern configuration diagram of the present embodiment. FIG. 2A shows an insert pattern deviated to the right side of that drawing by $W_e$, whereas FIG. 2B shows the insert pattern deviated to the left side of the drawing by the same $W_e$. (Hereafter, tape pattern diagrams FIGS. 2A and 2B are illustrated in these forms.) FIG. 3A shows relations of head mounting angles. FIG. 3B shows relations among head mounting height values and a recording process at the editing point. Although it shows a positional relation of a tape pattern and heads over 360 degrees, actual track length and head-tape contact interval are of one half of scale shown in FIG. 3B; i.e., only 180 degrees. (Hereafter, head mounting angle relation diagrams A and head mounting height relation diagrams B are illustrated in these forms.) The present embodiment has a configuration as shown in FIG. 1. A video signal which is an input signal undergoes shuffling, parity addition for error correction, addition of a synchronizing signal and modulation in signal processing means 1. The video signal is then supplied to signal recording means 2, comprising a recording amplifier and a recording head, and recorded onto tape of a recording medium 4 under the control of system control means 3 at the time of recording. On the basis of a system reference synchronizing signal and a VTR control signal such as recording/rewind/stop or edit mode supplied from the system control means 3, track arrangement determining means 5 determines so as to record successively synchronizing blocks of the video signal corresponding to one field onto two tracks of the tape, controls the signal processing means 1, and transmits that information to guard position determining means 6. On the basis of this information, guard position determining means 6 determines the position of a guard to be added for lightening (reducing) disturbance due to the residue of erasing of the same azimuth as the track of the in-point, and controls guard adding means 7 which comprises a flying erase head amplifier and a flying erase head to add the guard.

Head configuration will now be described by referring to FIGS. 3A and 3B. Behind (lagging) wide-width recording heads (RECa and RECb) each having a head width $W_{rec}$, flying erase heads (FEa ard FEb) each having the same width as guard width $W_g$ are mounted, respectively. Behind them, reproducing heads (PBa and PBb) each having a sufficiently wide width as compared with the value $W_e$ of track deviation are mounted, respectively. Further, in this head configuration, the flying erase head is activated only at the in-point of editing.

It is now assumed that the intensity of disturbance caused on the reproduced signal by disturbance of the same azimuth is represented by a disturbance coefficient K as compared with the degree of degradation of the reproduced signal caused by the reduction in track width. Further assuming that the track pitch is $W_p$ and the worst value of tracking deviation in VTR design is $W_{em}$, guard width $W_g$ and recording head width $W_{rec}$ are set as represented by the following equations.

$$W_g = W_{em}(K-1)/(K+1) \quad (1)$$

$$W_{rec} = ((K+2)W_p + (K-1)W_{em})/(K+2) \quad (2)$$

In a magnetic recording and reproducing apparatus having head configuration as heretofore described, the present embodiment comprises the signal recording means 2 for recording signals so that at least one track region including tracks recorded by heads having two or more different azimuth angles and alternately disposed may be provided and the track width of a new track may become wider on the backside only in a place where the backside of the new track abuts on a track previously recorded, and guard position determining means 6 for determining the guard position so that a guard may be disposed only in a place where the front of a new track newly recorded abuts on a track already recorded. As shown in FIG. 2, the guard is so added that the track width of the inserted track may not be reduced.

In the tape pattern configuration of the above described present embodiment, it is evident from FIG. 2 that degradation at the time of editing may be caused on tracks ($T_{ai}$ and $T_{ao}$) immediately succeeding respectively the in-point and the out-point when the insert pattern loses and on tracks ($T_{bi}$ and $T_{bo}$) immediately preceding respectively the in-point and the out-point when the insert pattern gains. In case of the insert pattern, the degradation is disturbance due to residue from the of erasing of the same azimuth. In case of the original pattern, the degradation is a reduction in track width.

It is now assumed that a value obtained by converting the quality of the reproduced signal into a track width is defined as equivalent effective track width ET. Further, it is assumed that the value of the worst tracking deviation is $W_{em}$. When $W_{em} \geq W_g$, equivalent effective track widths $ET(T_{ai})$, $ET(T_{ao})$, $ET(T_{bi})$ and $ET(T_{bo})$ respectively of degraded tracks ($T_{ai}$, $T_{ao}$, $T_{bi}$ and $T_{bo}$) can be represented by the following equations.

$$ET(T_{ai}) = W_p - K(W_e - W_g) \quad (3)$$

$$\begin{aligned} ET(T_{ao}) &= W_p - (W_o + (W_{rec} - W_p)) \\ &= 2W_p - (W_e + W_{rec}) \end{aligned} \quad (4)$$

$$ET(T_{bi}) = W_p - (W_e - W_g) \quad (5)$$

$$\begin{aligned} ET(T_{bo}) &= W_{rec} - K(W_p + W_e - W_{rec}) \\ &= (1 + K)W_{rec} - K(W_p + W_e) \end{aligned} \quad (6)$$

As evident from equation (3), the value of reduction of disturbance of the same azimuth caused by the guard becomes the guard width $W_g$. When the disturbance coefficient K is 2, the value of improvement is ⅓ from equation (1). In the same way, the reduction effect of disturbance of the same azimuth owing to the effect of the wide-width recording head is $3(W_{rec} - W_p)$ from equation (6) and (⅔).$W_{em}$ from equation (2). Insert editing has heretofore been described. In case of assemble editing, full erasing is activated after the in-point is passed and disorder of image at the time of reproduction of the out-point need not be considered. This is completely the same as the in-point of insert.

Figure 16:
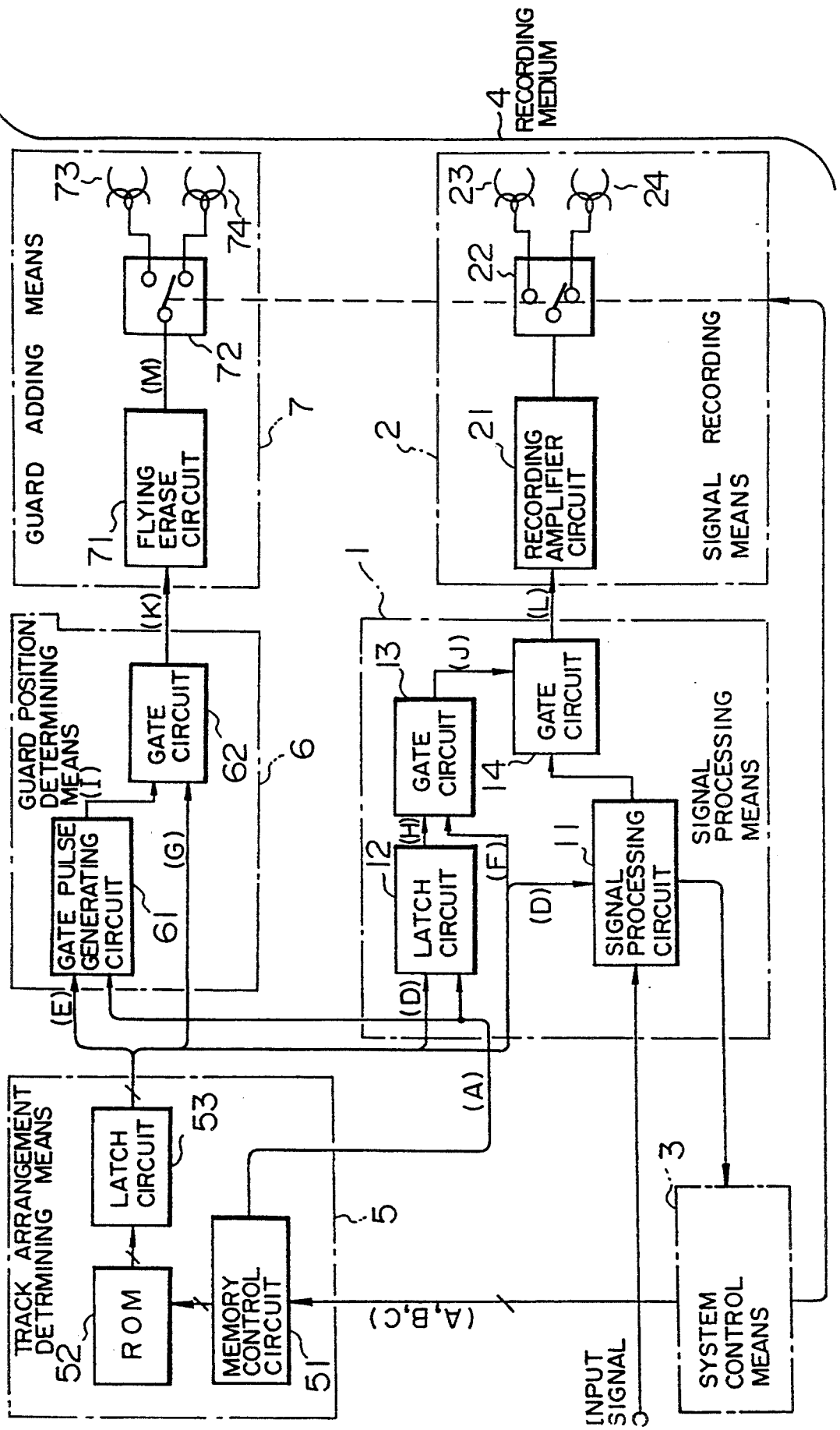
FIG. 16 is a more concrete configuration diagram of the configuration of the first embodiment.
Figure 17:
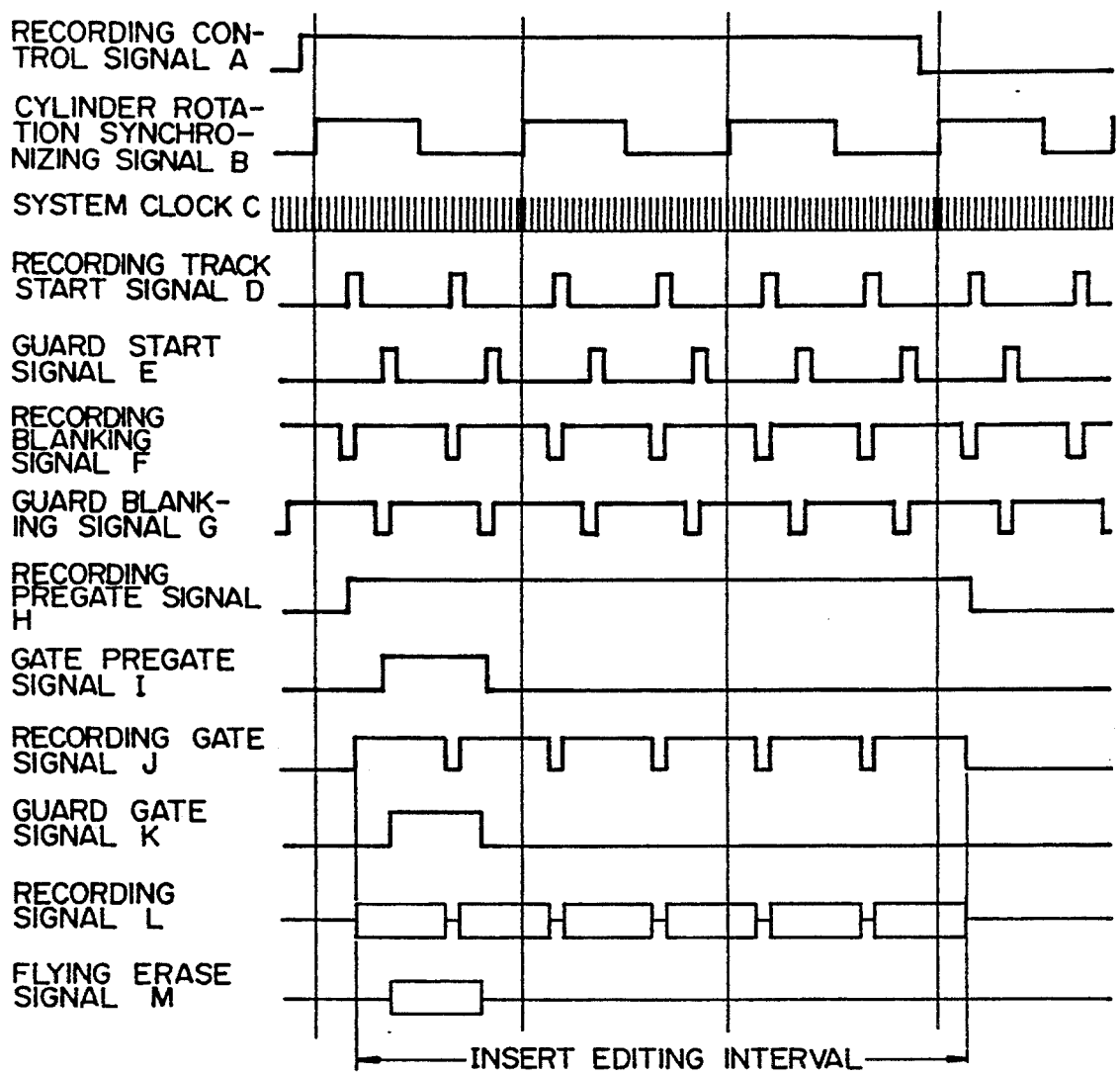
FIG. 17 is a signal timing chart of the configuration shown in FIG. 16.
Figure 18:
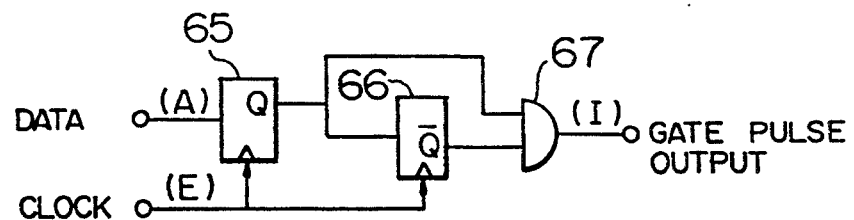
FIG. 18 is a concrete circuit diagram of a gate pulse generating circuit shown in FIG. 16.
Figure 19A:
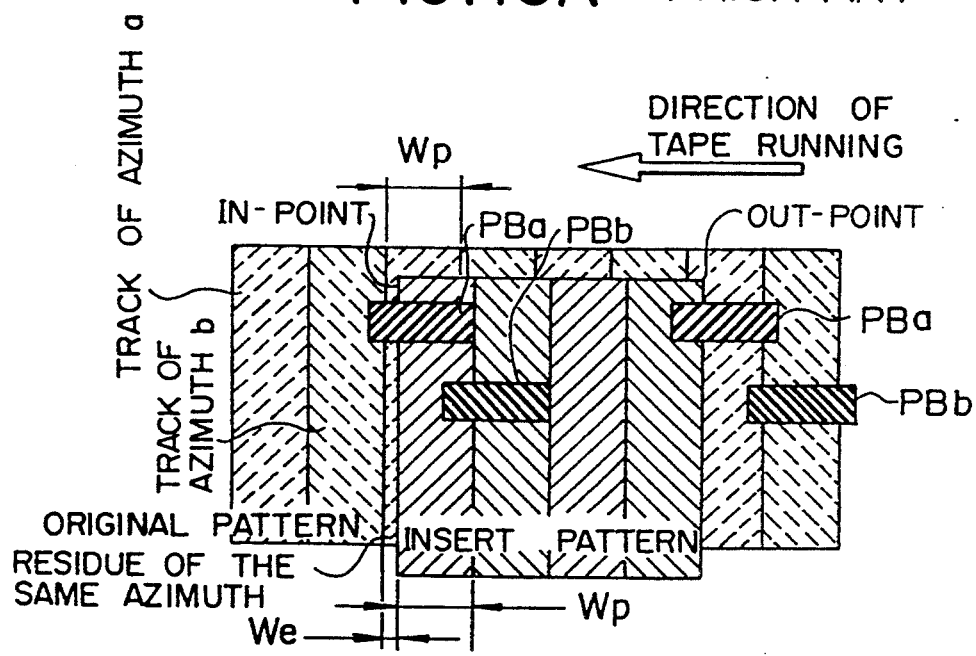
FIGS. 19A and 19B show tape pattern diagrams illustrating the prior art.
Figure 19B:
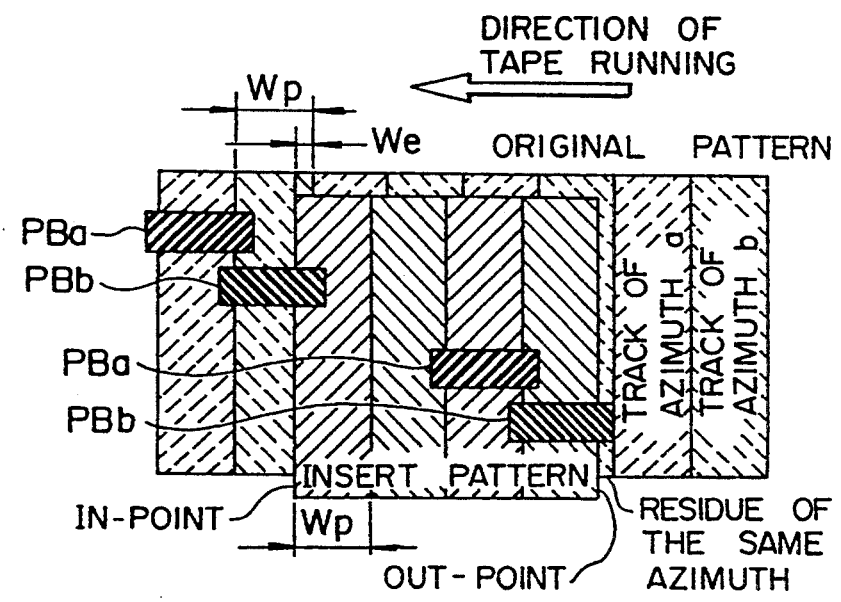

The present embodiment has heretofore been described by referring to FIG. 1 which is the configuration diagram thereof. An example of configuration of blocks will hereafter be described more specifically by referring to FIGS. 16 to 18. FIG. 16 is a configuration diagram showing FIG. 1 in more detail. FIG. 17 is a time chart for explaining FIG. 16. FIG. 18 shows a practical circuit of a gate pulse generating circuit 61 illustrated in FIG. 16. Signal waveforms A–M of the time chart shown in FIG. 17 correspond to signals A–M of FIG. 16. The track arrangement determining means 5 comprises a ROM 52, a memory control circuit 51 for controlling the ROM 52, and a latch circuit 53. On the basis of a recording control signal A, a cylinder rotation synchronizing signal B and a system clock signal C, the track arrangement determining means 5 generates recording blanking signal F for avoiding the use with the exception of effective wrap angle of tape, a guard blanking signal G, a recording track start signal D for determining the recording timing of the recording signal and the guard, and a guard start signal E.

In the signal processing means 1, a latch circuit 12 generates a recording pregate signal H on the basis of the recording control signal A and the recording track start signal D. In response to the recording pregate signal H, a gate circuit 13 gates the recording blanking signal F to generate a recording gate signal J. In response to the recording gate signal J, a gate circuit 14 gates an output signal of a signal processing circuit 11 generated at the timing of the recording track start signal D to output a recording signal L.

In the signal recording means 2, the input signal L is amplified by a recording amplifier circuit 21, passed through a 180-degree head changeover switch 22, and recorded onto the recording medium 4 alternately by recording heads 23 and 24. In the guard position determining means 6, a guard pregate signal I is produced from the recording control signal A and the guard start signal E, and the guard blanking signal G is gated by the guard pregate signal I, resulting in a guard gate signal K having a waveform K. In the guard adding means 7, a flying erase circuit 71 oscillates during the high-level interval of the guard gate signal K to generate a flying erase signal having a waveform M. The flying erase signal passes through a 180-degree head changeover switch 72 and erases signals recorded on the recording medium 4 at either flying erase head 73 or 74. As shown in FIG. 18, the gate pulse generating circuit 61 comprises two D latches 65 and 66 and one AND gate.

A more specific example of the configuration of the blocks of the present invention has heretofore been described. The guard position determining algorithm of the guard position determining means 6 will hereafter be described complementarily. In the process for producing the guard pregate signal I of the guard position determining means 6, the rising edge of the recording control signal A is detected by taking a track as the unit. It is detected that a track preceding the track now being recorded by one track has not been recorded by recording of this time. By detecting the rising edge of the recording control signal, it is thus implemented in the present embodiment to predict the final adjacency relation between a new track to be recorded and the track previously recorded, determine the position of a guard to be added for the purpose of preventing residue of erasing of the same azimuth, and add guards selectively.

For brevity of description, it has been assumed in the present embodiment that only video signals are recorded. Even if four-channel audio signals are included, however, there is no problem at all. It is also easy to accommodate 4-channel audio signals A1-A4 so that one track may comprise four sectors and arrangement may be changed with two tracks taken as a period. In that case, it is more realistic to implement the track arrangement determining means 5 and the guard position determining means 6 by using software of a microprocessor. Therefore, the track arrangement determining algorithm of the track arrangement determining means 5 is adapted to make a determination on the basis of which sector of every two tracks is being scanned by the recording head and which is selected out of five signals comprising the video signal and the 4-channel audio signals A1-A4 as the recording signal. The determining algorithm of the guard position determining means 6 is adapted to make a determination so as to dispose a guard between sectors when the same sector preceding a sector to be newly recorded by one track is not racorded in the editing or recording mode of the same time.

Figure 4A:
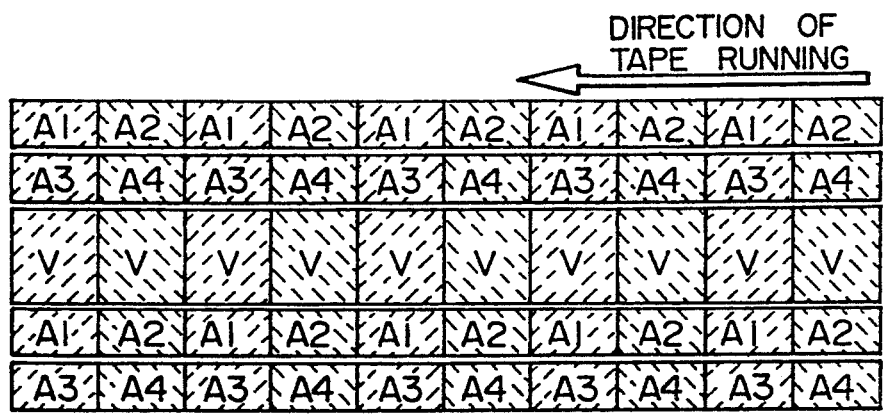
FIGS. 4A to 4C show another tape pattern diagrams of the first embodiment.
Figure 4B:
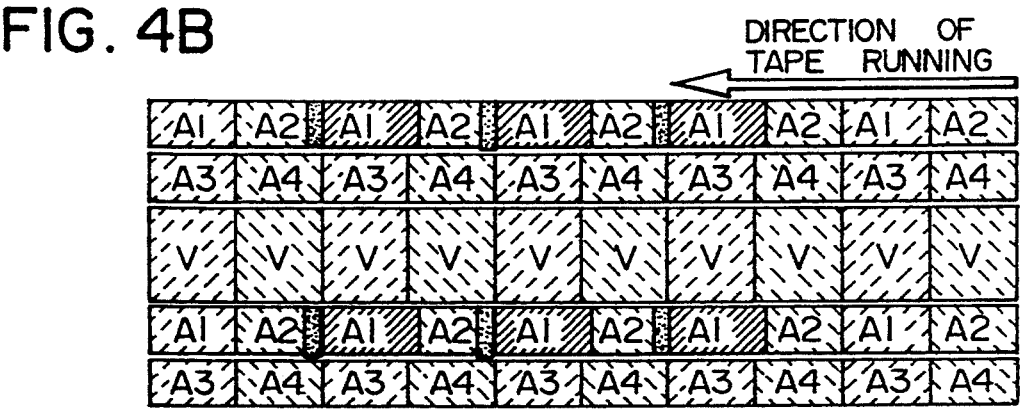
Figure 4C:
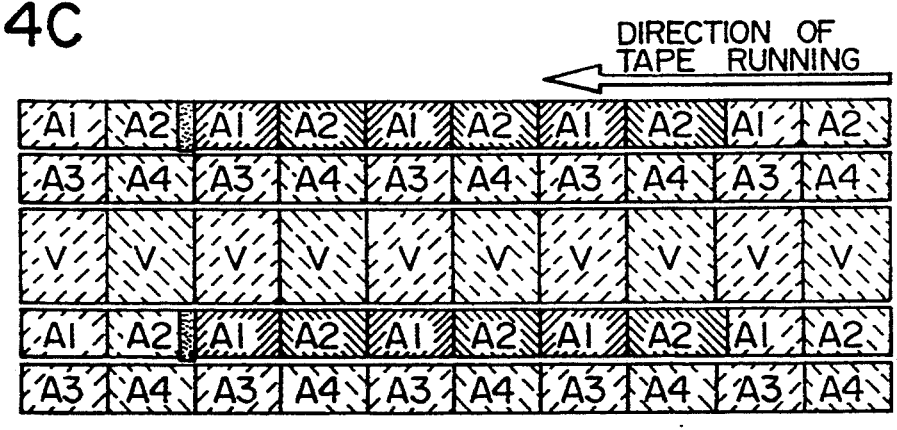

In case only the channel A1 of the audio signal is inserted in such a track arrangement, a guard is added only between the track of channel A1 of the audio signal newly recorded and a track previously recorded as shown in FIG. 4B. Further, in case two channels A1 and A2 of the audio signal are inserted, a guard is added only between the track of channel A1 of audio signal newly recorded and a track previously recorded as shown in FIG. 4C and hence a guard is added to only the in-point of insert editing.

Further, in the present embodiment, a wide-width reproducing head is used. In case the disturbance coefficient K is not less than three, however, use of a narrow-width reproducing head yields a better result. In that case, the guard width $W_g$ is preferably defined as half of the largest track deviation $W_{em}$ and the recording head width $W_{rec}$ is preferably defined as the track pitch $W_p$ plus half of the above described $W_{em}$ whereas reproducing head width $W_{pb}$ is preferably defined as the above described $W_p$ plus the above described $W_{em}$.

Further, in the present embodiment, the recording head width $W_{rec}$ is determined as the optimum value on the basis of equations (4) and (6) on the assumption that insertion is performed at the same point only once. If it is taken into consideration to perform insertion at the same time twice or more, therefore, the recording head width can be derived by replacing equation (6) with the following equation.

$$ET(T_{bo}) = W_{rec} - K \cdot W_e \qquad (7)$$

The recording head width $W_{rec}$ becomes optimum when the following relation is satisfied.

$$W_{rec} = W_p + W_e(K-1)/2 \qquad (8)$$

However, this does not hold true when the editing point of the second time or later is located in a track preceding or succeeding the editing point on the original track by one track.

The equations for calculating the optimum recording head width heretofore described are based on the assumption that the aximuth effect of the head can be sufficiently anticipated. When the azimuth angle is small or the track width becomes very small, disturbance from an adjacent track of the opposite azimuth must also be taken into consideration.

Even if the guard width and the recording track width are somewhat changed because of precision in head working and sharing of the head with other kinds of machines, an effect of reducing the disturbance of the same azimuth can be somewhat anticipated although the effect is lowered.

In case editing is performed near the same editing point only once, the present embodiment heretofore described brings about an effect of reducing the disturbance of the same azimuth by the guard using flying erase or the wide-width recording head without reducing the track width excepting the vicinity of the editing point.

A second embodiment will now be described. The present embodiment aims at realizing the tape pattern of the first embodiment by using a flying erase head which does not need high precision of track width.

Figure 5A:
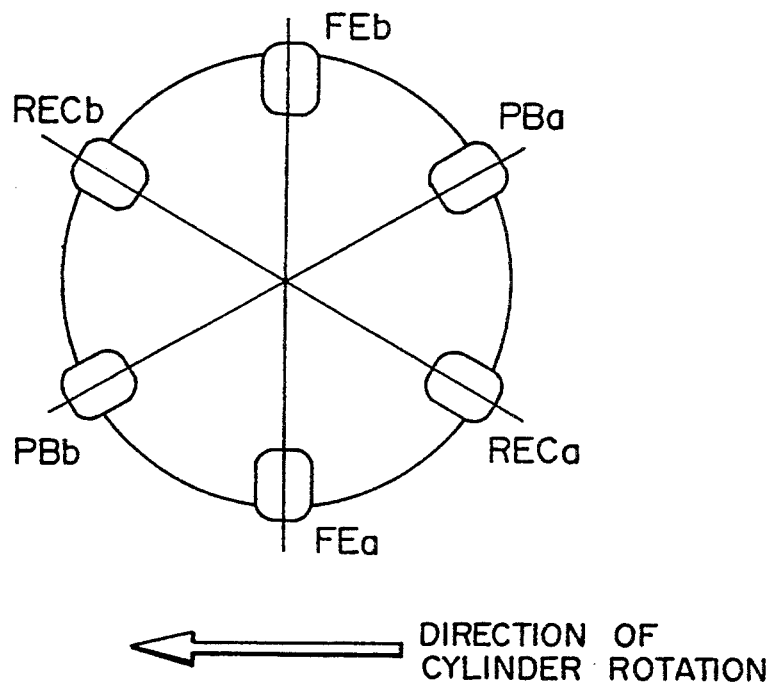
FIGS. 5A and 5B show head mounting diagrams in a second embodiment of the present invention.
Figure 5B:
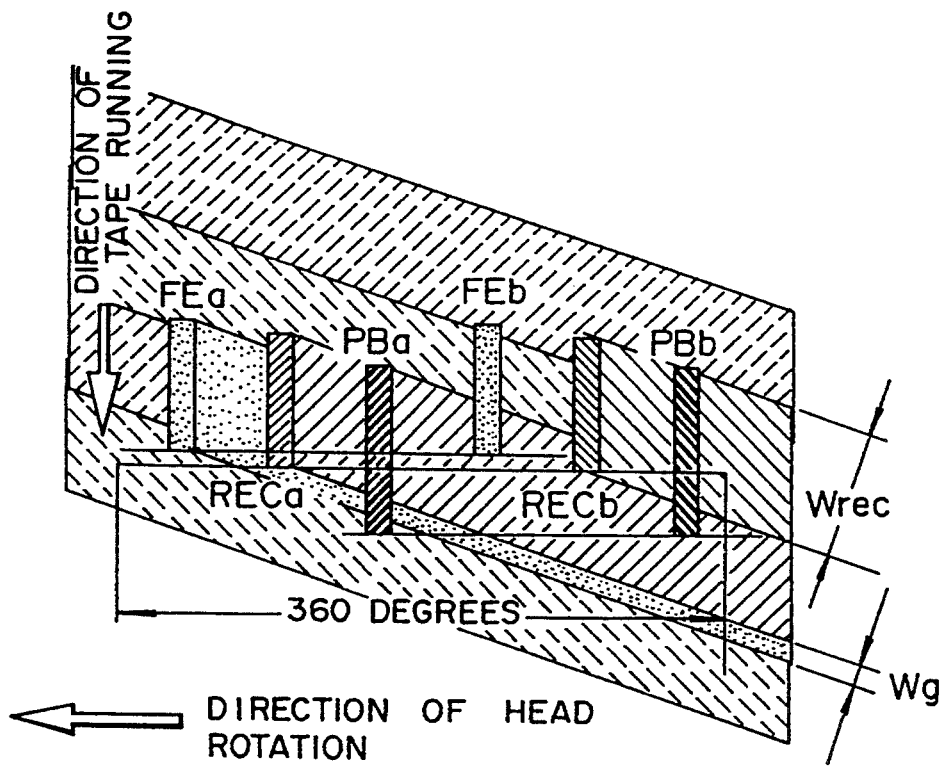

As shown in FIGS. 5A and 5B, the present embodiment comprises recording means including recording heads (RECa and RECb) each having a width wider than the track pitch $W_p$ and two or more azimuth angles, guard adding means including flying erase heads (FEa and FEb) mounted ahead of heading the recording heads, each of the flying erase heads having a width wider than at least the guard width, guard position determining means for making a determination so that the flying erase heads of the above described guard adding means may perform erasing in advance only in a place where the front of a newly recorded track abuts on an already recorded track, and reproducing means including reproducing heads (PBa and PBb) mounted behind the wide-width recording heads (RECa and RECb), each of the reproducing heads having a width sufficiently larger than the value $W_c$ of track deviation.

By using the configuration of the above described embodiment, the tape pattern becomes the same as that of the first embodiment as evident from FIG. 5B although they differ in width and arrangement of flying erase heads. In case editing is performed in the vicinity of the same editing point only once, disturbance of the same azimuth is thus reduced by the guard using the flying erase or the wide-width recording heads without reducing the track width excepting the vicinity of the editing point. Further, when a head is to be attached to the rotary cylinder it is typically performed by using the bottom edge criterion facilitating the method of construction. Therefore, the precision of the guard width depends upon the relation between the bottom edge of the flying erase head and the bottom edge of the recording heads, and the head width precision of the flying erase head becomes unnecessary. As heretofore described, the present embodiment which uses flying erase heads having low precision in head width brings about an effect that the disturbance of the same azimuth can be reduced at the in-point of editing by the guard formed by the flying erase operation and at the out-point by the wide-width recording heads.

A third embodiment of the present invention will hereafter be described. Even for a plurality of times of editing at the same point, the present embodiment aims at reducing the disturbance due to the residue of erasing of the same azimuth without reducing the track width except in the vicinity of the editing point.

Figure 6A:
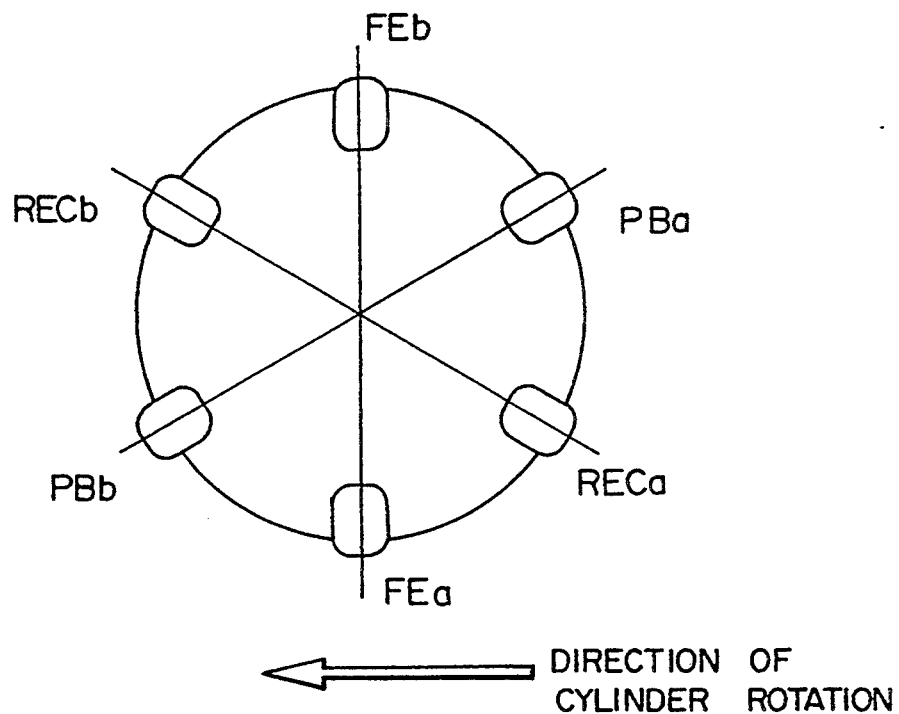
FIGS. 6A and 6B show head mounting diagrams in a third embodiment of the present invention.
Figure 6B:
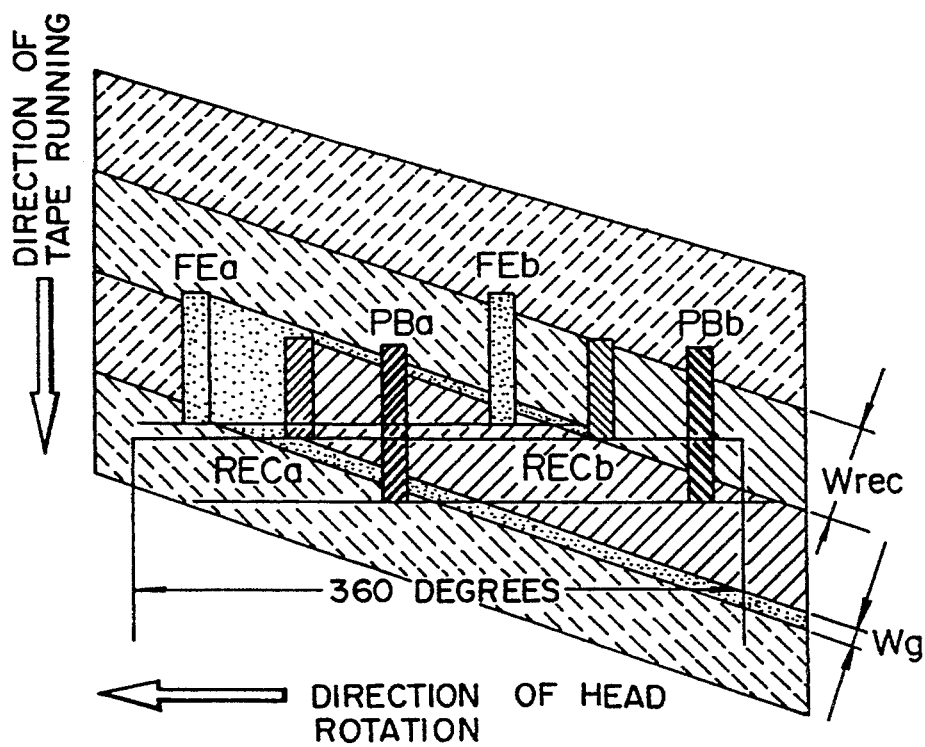
Figure 7A:
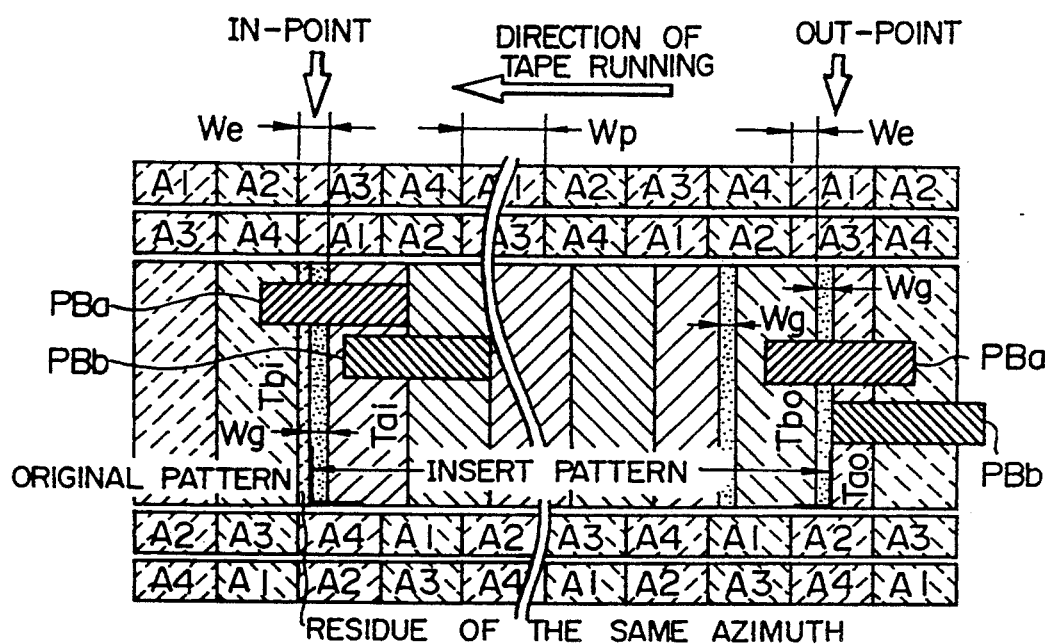
FIGS. 7A and 7B show tape pattern diagrams in the third embodiment.
Figure 7B:
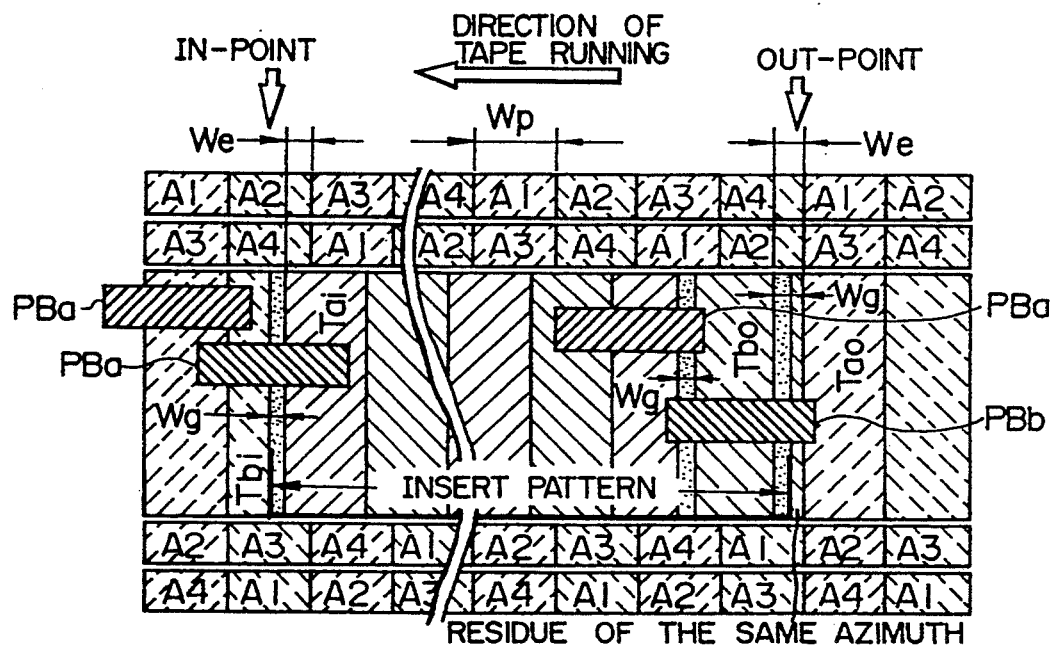

The configuration of the present embodiment will hereafter be described. Recording signals comprise video signals and audio signals of four channels A1–A4. FIGS. 6A and 6B show the head configuration and recording process of the present embodiment FIGS. 7A and 7B show editing tape patterns in the present embodiment. Only the video portion undergoes insert editing.

As shown in FIGS. 7A and 7B, a magnetic recording apparatus of the present embodiment comprises guard position determining means for determining guard positions in recording so that a guard may be disposed in a place where the (leading) front side of a new track to be newly recorded abuts on a previous y recorded track and guards may also be disposed before and behind a new track abutting on a previously recorded track on the backside (lagging side) thereof. As for the head configuration, recording heads (RECa and RECb) each having a head width equivalent to the track pitch are mounted behind wide-width flying erase heads (FEa and FEb) each having a head width equivalent to the track pitch $W_p$ plus twice the guard width $W_g$. Reproducing heads (Pbs and PBb) each having a width sufficiently larger than the track deviation $W_e$ are mounted behind the recording heads. In this magnetic recording and reproducing apparatus, the flying erase heads are activated only at the in-point and out-point of editing. The guard width $W_g$ is defined as $$W_g = W_{em} \cdot (K-1)/(K+1) \tag{9}$$

where K is the disturbance coefficient, $W_p$ is the track pitch, and $W_{em}$ is the worst tracking deviation in the same way as the first embodiment.

In case insert editing is performed in the configuration of the present embodiment heretofore described, flying erase heads are activated only as the in-point and out-point, and hence guards are added to three locations, i.e., in-point boundary, out-point of the insert track, and the track boundary immediately before the out-point as shown in FIG. 7. That is to say, there is no spread of track width at the out-point of the insert pattern unlike the above described first embodiment. Owing to the guards, residue of erasing of the same azimuth is eliminated at the in-point and out-point by the guard width $W_g$, resulting in reduced disturbance due to residue of erasing of the same azimuth. Assuming now that the equivalent effective track width is ET and the worst tracking deviation $W_{em} \geq W_g$, equivalent effective track widths $ET(T_{ai})$ and $ET(T_{bi})$ respectively of tracks $T_{ai}$ and $T_{bi}$ at the in-point degraded by insert editing performed once can be represented by the following equations.

$$ET(T_{ai}) = W_p - K(W_{em} - W_g) \tag{10}$$

(Track immediately succeeding the in-point shown in FIG. 7A)

$$ET(T_{bi}) = W_p - (W_{em} - W_g) \tag{11}$$

(Track immediately before the in-point shown in FIG. 7B)

If insert editing is performed in such a state that tracking is deviated to the opposite direction, widths of the above described two tracks are shaved in the worst case, and equations (10) and (11) become as follows.

$$ET(T_{ai}) = W_p - K(W_{em} - W_g) - (W_{em} + W_g) \tag{12}$$

(Track immediately succeeding the in-point shown in FIG. 7A)

$$ET(T_{bi}) = W_p - (W_{em} + 2W_g) \tag{13}$$

(Track immediately before the in-point shown in FIG. 7B) Even if the insert operation of the third time is conducted, both sides of the track are already in the worst state and hence further degradation is not caused. The same holds true for the out-point as well.

Even if editing is performed at the same point any number of times, disturbance due to residue of erasing of the same azimuth is reduced in the present embodiment as heretofore described.

A fourth embodiment of the present invention will hereafter be described. The present embodiment aims at reducing the disturbance due to residue of erasing of the same azimuth without reducing the track width of tracks at all at the time of editing excepting the in-point and out-point of the original tape pattern.

Figure 8A:
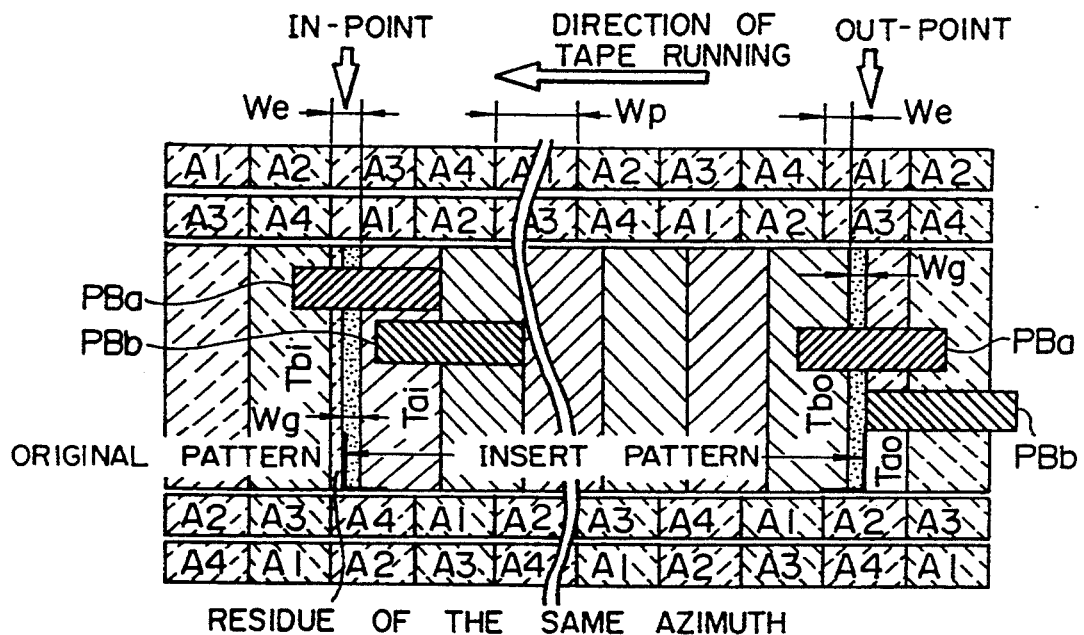
FIGS. 8A and 8B show tape pattern diagrams in a fourth embodiment of the present invention.
Figure 8B:
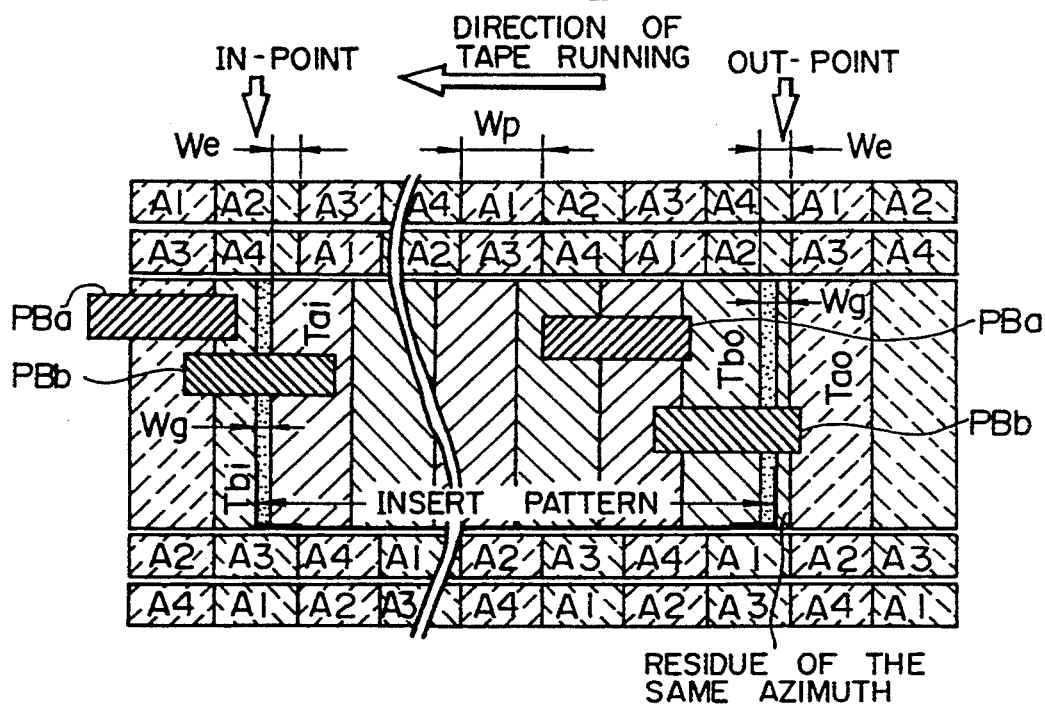
Figure 9A:
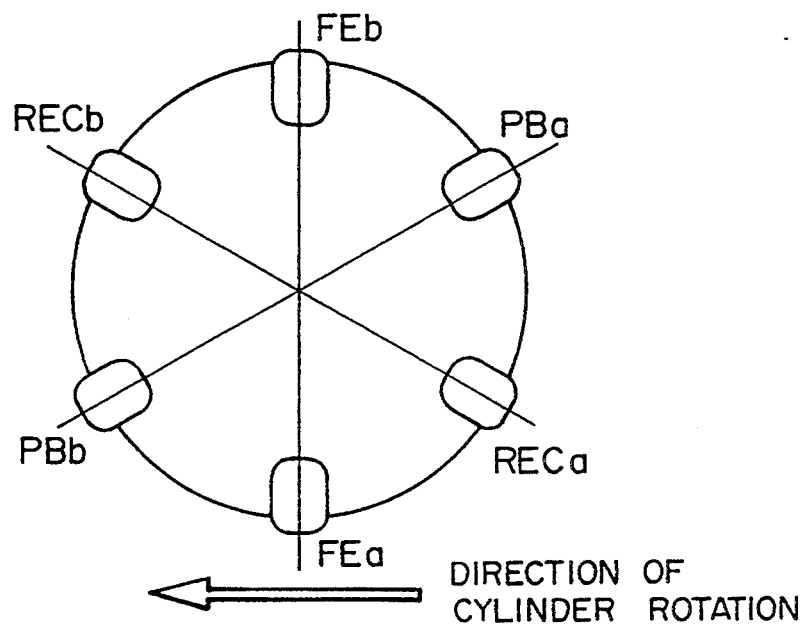
FIGS. 9A and 9B show head mounting diagrams of the fourth embodiment.

FIGS. 8A and 8B show tape pattern diagrams of the present embodiment. Configuration and operation of the present embodiment will hereafter be described by referring to FIGS. 9A and 9B which show the head configuration for its recording and the recording process at its editing point.

Figure 9B:
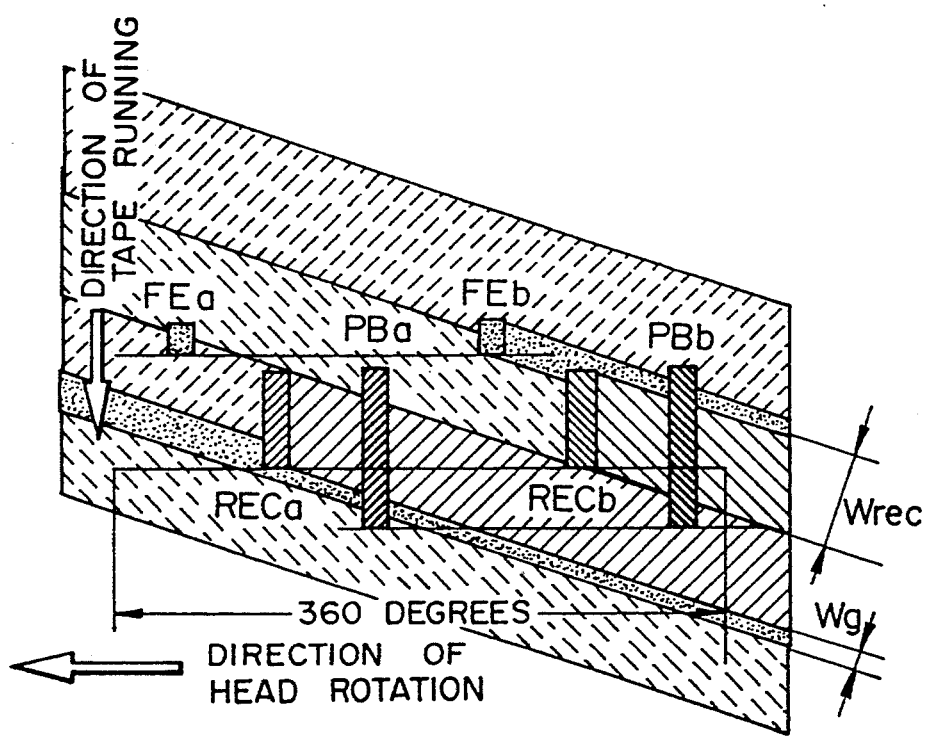

In the head configuration of the present embodiment, wide-width recording heads (RECa and RECb) are mounted one track or more after flying erase heads (FEa and FEb) each having a width equivalent to twice the guard width $W_g$ as shown in FIG. 9B. Behind the recording heads, reproducing heads (PBa and PBb) each having a width sufficiently larger than the track deviation $W_e$ are mounted. Further, in this head configuration, the flying erase heads are activated only at the in-point and out-point of editing. It is now assumed that the intensity of disturbance caused on the reproduced signal by disturbance of the same azimuth is represented by a disturbance coefficient K as compared with the degree of degradation of the reproduced signal caused by the reduction in track width. Further assuming that the track pitch is $W_p$ and the worst value of tracking deviation in VTR design is $W_{em}$, guard width $W_g$ and recording head width $W_{rec}$ are set as represented by the following expressions.

$$W_{rec} \leq W_p + W_g \qquad (14)$$

$$W_g = W_{em}(K-1)/(K+1) \qquad (15)$$

A recording apparatus of the present embodiment is so configured as to comprise guard adding means and signal recording means respectively including flying erase heads and recording heads having head configuration as heretofore described, and guard position determining means for determining guard positions in recording so that a guard may be disposed only between a track to be newly recorded and a previously recorded track.

In the recording tape pattern configuration of the present embodiment heretofore described, degradation due to editing performed once may be caused on tracks ($T_{ai}$ and $T_{ao}$) immediately succeeding respectively the in-point and the out-point when the insert pattern loses and on tracks ($T_{bi}$ and $T_{bo}$) immediately preceding respectively the in-point and the out-point when the insert pattern gains as evident from FIG. 8. In case of the insert pattern, the degradation is disturbance due to residue of erasing of the same azimuth. In case of the original pattern, the degradation is a reduction in track width.

It is now assumed that a value obtained by converting the quality of the reproduced signal into a track width is defined as equivalent effective track width ET. Further, it is assumed that the value of the worst tracking deviation is $W_{em}$. When $W_{em} \geq W_g$, equivalent effective track widths $ET(T_{ai})$, $ET(T_{ao})$, $ET(T_{bi})$ and $ET(T_{bo})$ respectively of degraded tracks ($T_{ai}$, $T_{ao}$, $T_{bi}$ and $T_{bo}$) can be represented by the following equations.

$$ET(T_{ai}) = W_p - K(W_e - W_g) \qquad (16)$$

$$ET(T_{ao}) = W_p - (W_e + W_g) \qquad (17)$$

$$ET(T_{bi}) = W_p - (W_e + W_g) \qquad (18)$$

$$ET(T_{bo}) = W_p - K(W_e - W_g) \qquad (19)$$

As evident from the above described equations (16)–(19) and FIG. 8, the reduction in the equivalent effective track width due to the disturbance of the same azimuth is lightened by the effect of the guard when the disturbance coefficient K exceeds unity. If insert editing is further performed after this editing, both sides of one track might be shaved in the worst case. By taking this into consideration, equivalent effective track widths $ET(T_{ai})$, $ET(T_{ao})$, $ET(T_{ai})$ and $ET(T_{bo})$ are changed as represented by the following equations.

$$ET(T_{ai}) = W_p - K(W_e - W_g) - (W_e + W_g) \qquad (20)$$

(Such a state that the backside of a track immediately succeeding the in-point is shaved as shown in FIG. 8A)

$$ET(T_{ao}) = W_p - (W_e + W_g) - W_g \qquad (21)$$

(Such a state that the backside of a track immediately succeeding the out-point is shaved as shown in FIG. 8A)

$$ET(T_{bi}) = W_p - (W_e + W_g) - W_g \qquad (22)$$

(Such a state that the frontside of a track immediately preceding the in-point is shaved as shown in FIG. 8B)

$$ET(T_{bo}) = W_p - K(W_e - W_g) - (W_e + W_g) \qquad (23)$$

(Such a state that the frontside of a track immediately preceding the out-point is shaved as shown in FIG. 8B)

As herefore described, the tape pattern of the present embodiment brings about an effect that the disturbance due to residue of erasing of the same azimuth is reduced by the guard without reducing the track width of tracks at all excepting those located at the in-point and out-point of the original tape pattern at the time of editing.

A fifth embodiment of the present invention will hereafter be described. In the same way as the fourth embodiment, the present embodiment aims at making an improvement over the disturbance due to the residue of erasing of overwriting as well while reducing the disturbance due to the residue of the same azimuth without reducing the track width excepting the in-point and out-point of the original tape pattern at the time of editing.

Figure 10A:
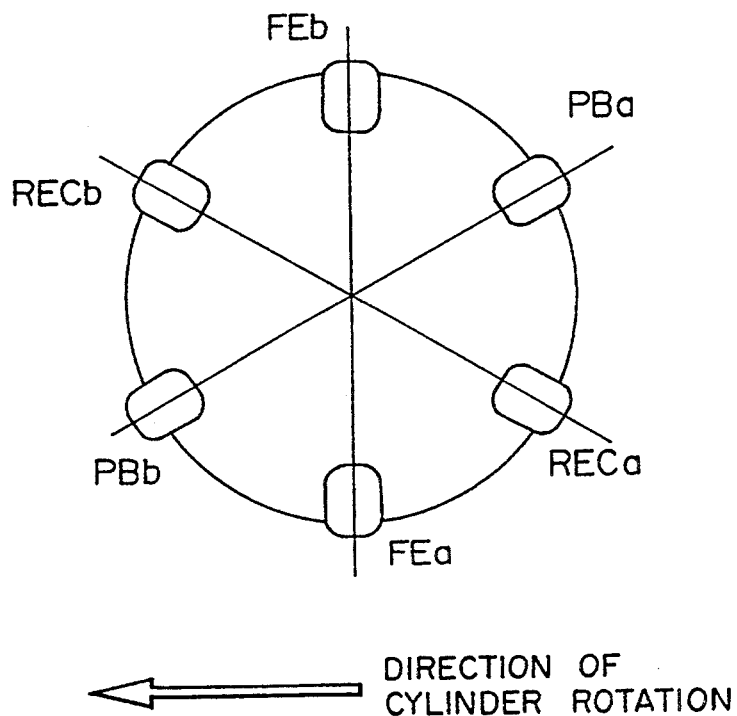
FIGS. 10A and 10B show head mounting diagrams in a fifth embodiment of the present invention.

Configuration of the present embodiment will hereafter be described. In the present embodiment, the head configuration of the fourth embodiment is adapted as shown in FIGS. 10A and 10B to comprise signal recording means including recording heads (RECa and RECb) each having a head width equivalent to the track pitch $W_p$, guard adding means including flying erase heads (FEa and FEb) mounted one track or more ahead of the recording heads, each of the flying erase heads having a width larger than the track pitch by twice the guard width $W_g$, reproducing means provided with head configuration including reproducing heads (PBa and PBb) each having a width sufficiently larger than the track deviation $W_e$ mounted behind the flying erase heads, and guard position determining means for making a determination so that the flying erase heads may erase in advance the track located in a portion to be recorded at the time of recording.

Figure 10B:
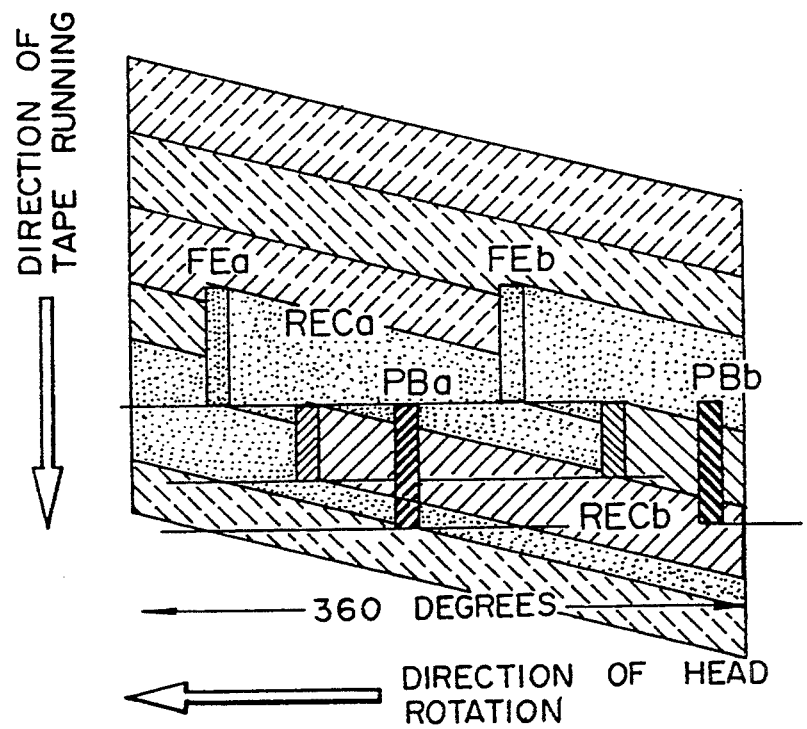

In the configuration of the present invention as heretofore described, flying erase heads are mounted one track or more ahead of recording heads as shown in FIG. 10B. Wide-width flying erase heads do not erase the insert track. After editing, the tape pattern as shown in FIG. 8 is obtained. For disturbance of the same azimuth, therefore, the same effect as the fourth embodiment described before is obtained. As for the disturbance due to the residue of overwrite erasing, it is not caused because the insert portion is erased beforehand over the entire track width.

As heretofore described, the tape pattern of the present embodiment maintains the effect of the above described embodiment that the disturbance due to the residue of erasing of the same azimuth is reduced without reducing the track width excepting the in-point and out-point of the original tape pattern at the time of editing. Since the insert portion is erased beforehand over the entire track width, an additional effect that residue of erasing due to overwriting is not caused is also obtained.

A sixth embodiment of the present invention will hereafter be described. In a VTR so configured as to handle a plurality of tracks as one unit of editing with respect to the track width direction, the present embodiment aims at reducing or preventing the disturbance due to the residue of erasing of the same azimuth without reducing the track width excepting the vicinity of the editing point.

Figure 11A:
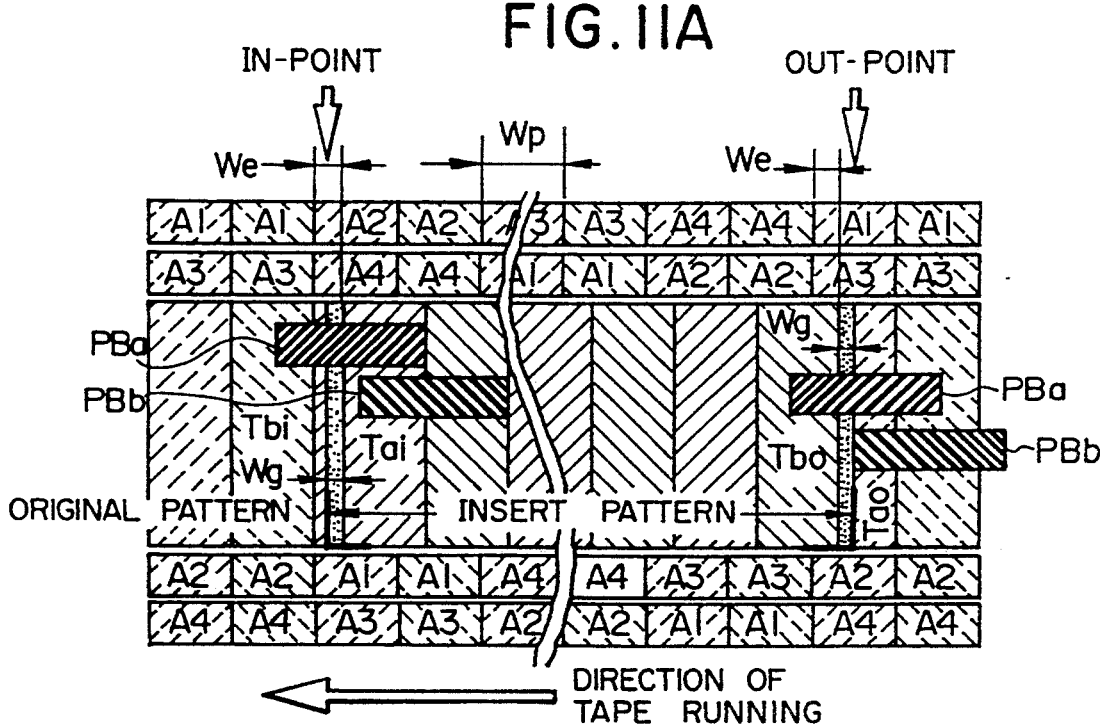
FIGS. 11A and 11B show tape pattern diagrams in a sixth embodiment of the present invention.
Figure 11B:
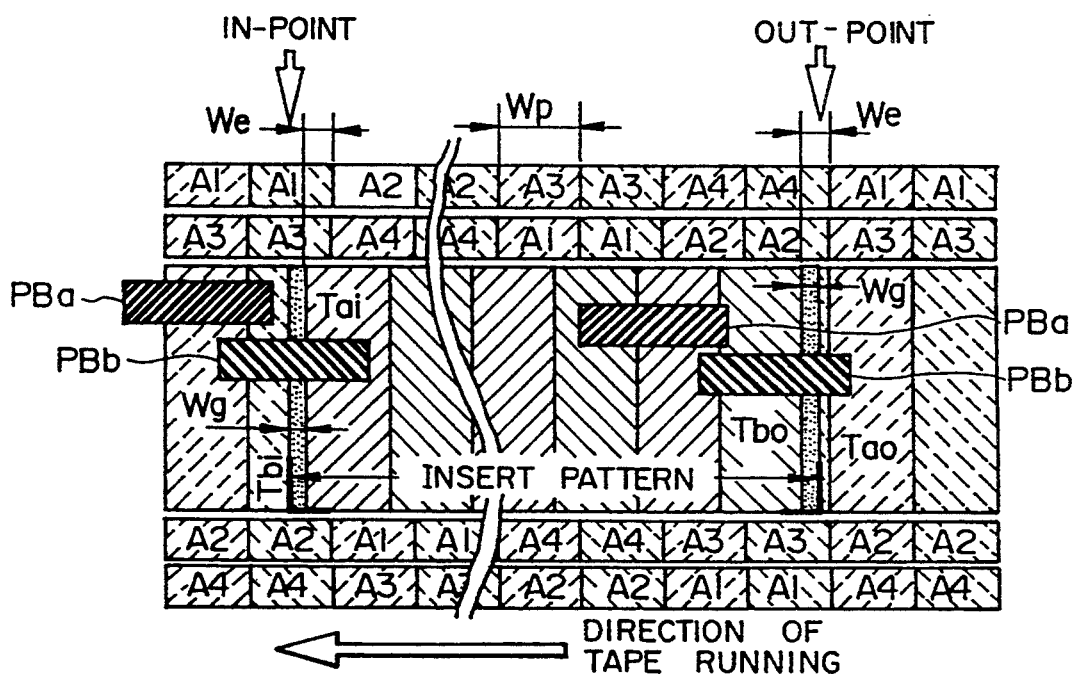

The present embodiment is an example in a VTR comprising tape wound over 180 degrees and recording heads and reproducing heads respectively having two kinds of azimuth, i.e., azimuth a and azimuth b respectively as pair heads. FIGS. 11A and 11B show tape pattern configuration diagrams of the present embodiment. Configuration and operation of the present embodiment will hereafter be described by referring to FIGS. 12A and 12B which show the head configuration for its recording and the recording process at its editing point.

Figure 12A:
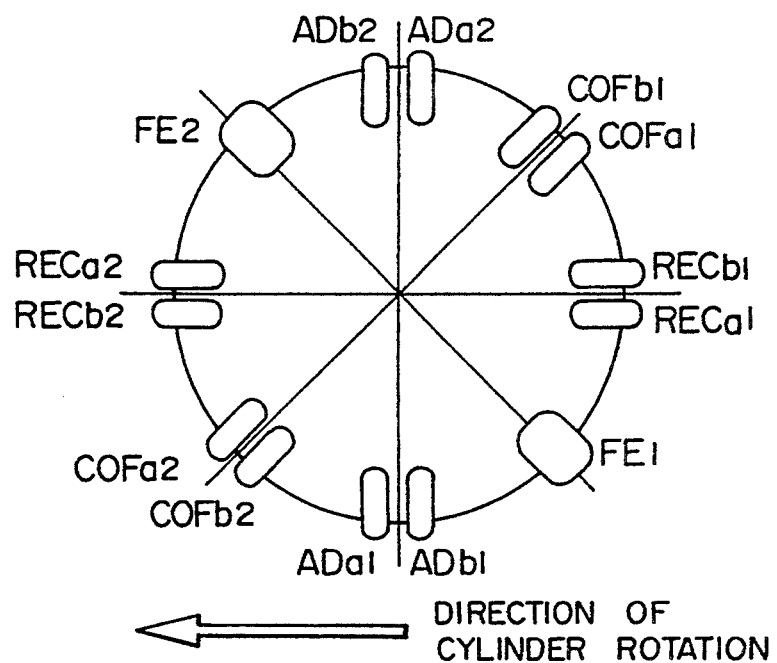
FIGS. 12A and 12B show head mounting diagrams in the sixth embodiment.
Figure 12B:
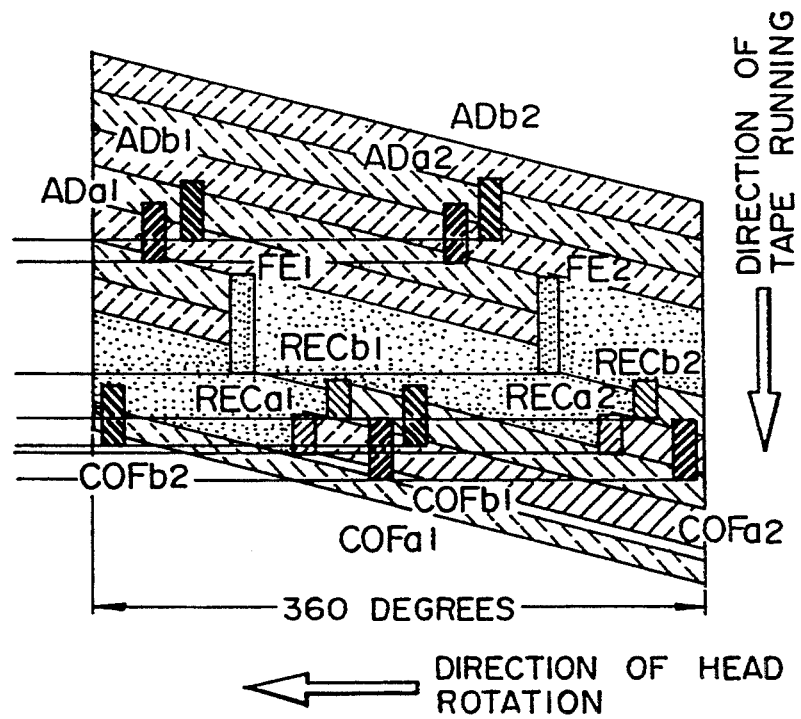

In accordance with the present embodiment, the magnetic recording apparatus of the fifth embodiment described before is adapted to comprise guard adding means including flying erase heads each having a head width corresponding to a plurality of tracks and signal recording means for handling the plurality of tracks as one recording unit with respect to the track width direction at the time of recording and performing the recording operation. As shown in FIG. 12A, the head configuration of the present embodiment comprises recording heads ($REC_{a1}-REC_{b2}$) each having a head width equivalent to the track pitch $W_p$, simultaneous reproducing meads ($COF_{a1}-COF_{b2}$) each having a width sufficiently larger than the track deviation $W_e$ mounted behind the recording heads, flying erase heads (FE1 and FE2) preceding the above described recording heads by two or more tracks and each having a width which is larger than twice the track pitch $W_p$ by twice the guard width $W_g$, and preceding reproducing heads ($AD_{a1}-AD_{b2}$) preceding to the flying erase heads by two or more tracks and each having a width sufficiently larger than the track deviation $W_e$. Further in this head configuration, flying erase heads are activated during the entire interval of the insert portion of editing. It is now assumed that the intensity of disturbance caused on the reproduced signal by disturbance of the same azimuth is represented by a disturbance coefficient K as compared with the degree of degradation of the reproduced signal caused by the reduction in track width. Further assuming that the track pitch is $W_p$ and the worst value of tracking deviation in VTR design is $W_{em}$, guard width $W_g$ is set as represented by the following equation.

$$W_g = W_{em}(K-1)/(K+1) \qquad (24)$$

By using the magnetic recording and reproducing apparatus having head configuration as heretofore described, the tape pattern of the present embodiment has such a configuration as shown in FIGS. 11A and 11B that each guard is provided between a new track and a previously recorded track at the time of editing in a track region including tracks of two azimuths alternately. In these Figures, PBa and PBb respectively denote a reproducing head of azimuth a and a reproducing head of azimuth b. They may be either of the preceding producing heads and the simultaneous producing heads. Further, they may be either of 1 and 2 located at the interval of 180°. (Hereafter, pattern diagrams are simply represented in this way.)

In the above described tape pattern configuration of the present embodiment, degradation at the time of editing may be caused on tracks ($T_{ai}$ and $T_{ao}$) immediately succeeding respectively the in-point and the out-point when the insert pattern loses and on tracks ($T_{bi}$ and $T_{bo}$) immediately preceding respectively the in-point and the out-point when the insert pattern gains as evident from FIG. 11. In case of the insert pattern, the degradation is disturbance due to residue of erasing of the same azimuth. In case of the original pattern, the degradation is a reduction in track width.

It is now assumed that a value obtained by converting the quality of the reproduced signal into a track width is defined as equivalent effective track width ET. Further, it is assumed that the value of the worst tracking deviation is $W_{em}$. When $W_{em} \geq W_g$, equivalent effective track widths $ET(T_{ai})$, $ET(T_{ao})$, $ET(T_{bi})$ and $ET(T_{bo})$ respectively of tracks ($T_{ai}$, $T_{bi}$ and $T_{bo}$) degraded by editing performed once are can be represented similarly to equations (16)-(19) of the above described fourth embodiment. The degree of reduction in disturbance of the same azimuth at the time when insert editing is performed only once is the same as that of the fourth embodiment described before. The degree of reduction in disturbance due to residue of erasing of overwriting is the same as that of the fifth embodiment. Further, in the present embodiment, editing is performed by taking two tracks as the unit. With regard to one track, only one side is degraded. Even when such editing as to define the adjacent area of the editing point as an editing point again is performed, therefore, increase of signal degradation at the editing point caused by repetition editing does not occur.

Even if the guard width and the recording track width are somewhat changed by dispersion in head fabrication, for example, the effect can be anticipated although the efficiency of reduction in disturbance of the same azimuth is somewhat lowered.

As heretofore described, the configuration of the present embodiment reduces the influence caused at the time of editing. Even in such a VTR that a plurality of tracks are handled as one unit at the time of editing with regard to the track width direction, therefore, the configuration of the present embodiment brings about an effect that the disturbance due to residue of erasing of the same azimuth can be reduced by the guard without reducing the track width excepting the in-point and the out-point of the original tape pattern at the time of editing.

The present embodiment has been implemented in combination with the fifth embodiment. In the same way, however, the present embodiment may also be implemented in combination with the second or third embodiment. In combination with the second embodiment, such handling as to make two tracks as one editing unit in the track width direction becomes possible by removing the flying erase head FEb of FIG. 5 and widening the width of the flying erase head FEa of FIG. 5 by a value corresponding to one track. In combination with the third embodiment, the above described handling becomes possible by adopting such a head configuration that the flying erase head FEb of FIG. 6 is removed and the width of the flying erase head FEa is widened by a value corresponding to one track. Its editing tape pattern takes such a shape that the guard which is one track ahead of the out-point of the insert pattern shown in FIG. 7 has been moved to a position which is two tracks ahead of the out-point.

As heretofore described, there may be used a recording apparatus comprising not less than one consecutive tracks to be recorded together being defined as one set of track, a recording trajectory obtained as a result of recording information having an amount to be recorded by one recording process as at least one set of tracks being defined as one information trajectory, a set of tracks contained in sets of tracks included in the above described one information trajectory newly recorded, the above described set of tracks being adjacent to another set of tracks included in another information trajectory recorded earlier than the above described one information trajectory, and the above described guard position determining means making a selection so as to dispose a guard (guards) on one location or two locations included in two locations respectively before and after the above described set of tracks and so as not to dispose guards elsewhere.

A seventh embodiment will hereafter be described. In the same way as the sixth embodiment, the present embodiment aims at relaxing head width precision when handling a plurality of tracks as one editing unit in the track width direction at the time of editing.

Figure 13A:
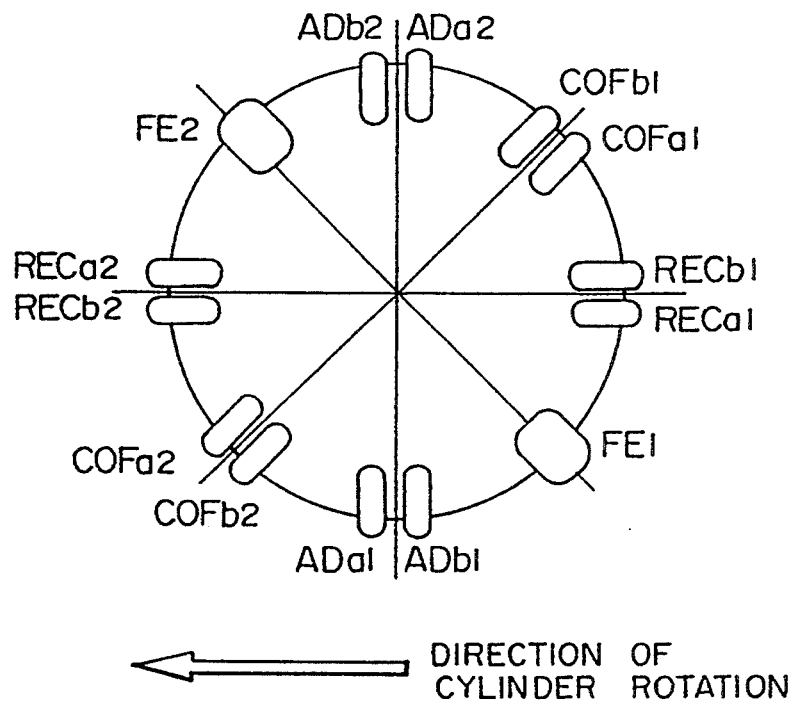
FIGS. 13A and 13B show head mounting diagrams in a seventh embodiment of the present invention.
Figure 13B:
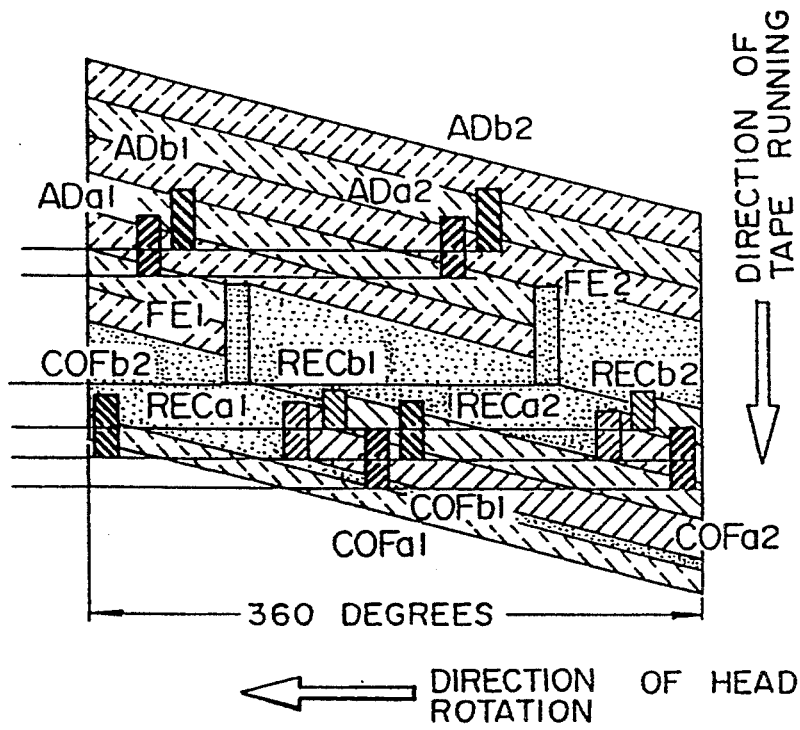

In a magnetic recording apparatus of the present embodiment, the signal recording means of the sixth embodiment is so configured that at least one of the recording heads may have a width equivalent to the track pitch and each of the remaining recording heads may have a width not less than the track pitch. FIGS. 13A and 13B show head configuration of the present embodiment. As shown in these Figures, head width of each of only the recording heads $REC_{b1}$ and $REC_{b2}$ of the sixth embodiment remains equivalent to the track pitch, head width of each of the remaining recording heads $REC_{a1}$ and $REC_{a2}$ is expanded, and the width of each of the flying erase heads remains equivalent to two tracks plus twice the guard.

In the configuration of the present embodiment heretofore described, tracks recorded by the recording heads $REC_{a1}$ and $REC_{a2}$ are certainly shaved by tracks recorded by the recording heads $REC_{b1}$ and $REC_{b2}$. This results in an effect that the width precision of the recording heads $REC_{a1}$ and $REC_{a2}$ becomes unnecessary.

The present embodiment has been implemented in combination with the sixth embodiment. In the same way, however, the present embodiment may also be implemented in combination with the third embodiment. The combination with the third embodiment becomes possible by using such a head configuration that the flying erase head FEb of FIG. 6 is removed and the width of the flying erase head FEa is widened by a value corresponding to one track whereas the head width of the recording head RECa is made somewhat larger than the track pitch. Its editing tape pattern takes such a shape that the guard which is one track ahead of the out-point of the insert pattern shown in FIG. 7 has been moved to a position which is two tracks ahead of the out-point.

An eighth embodiment of the present invention will hereafter be described. In a VTR for performing editing while taking two tracks as the unit and always handling the two tracks together as a-b track pair, the present embodiment aims at reducing the disturbance of the same azimuth at the editing point on the reproduction side as well. The present embodiment is a reproducing apparatus for reproducing a magnetic recording pattern, comprising tracks so recorded by heads of at least two kinds of azimuth angles as to be alternately disposed, the above described magnetic recording pattern being recorded by handling a plurality of tracks as one recording unit at the time of recording with regard to the track width direction and forming tracks of the recording unit, and width between both ends of reproducing heads for reproducing the above described tracks of recording unit at the time of reproduction being made narrower than at least the width of the above described tracks of recording unit. In this head configuration, the width and mounting height of reproducing heads of the head configuration shown in FIG. 12 of the sixth embodiment are changed. With respect to the recording track pattern as shown in FIG. 14, the head width of each of paired reproducing heads (Pba and Pbb) is extended to the inside of paired heads by maximum track deviation, and its outside is shaved by the above described maximum track deviation minus the guard width.

Figure 14A:
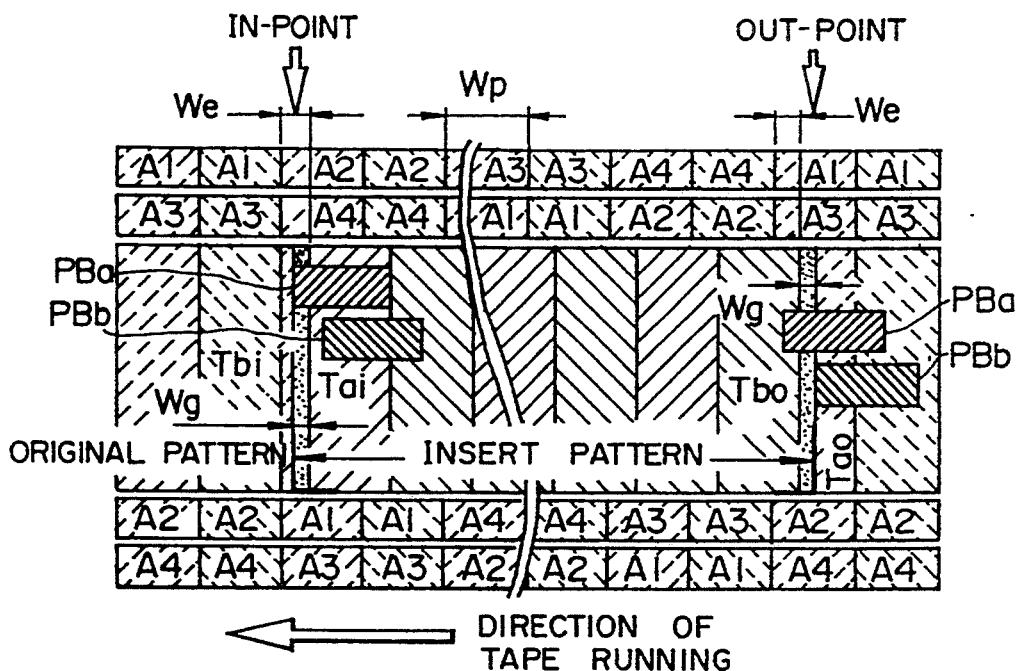
FIGS. 14A and 14B show tape pattern diagrams in an eight embodiment of the present invention.
Figure 14B:
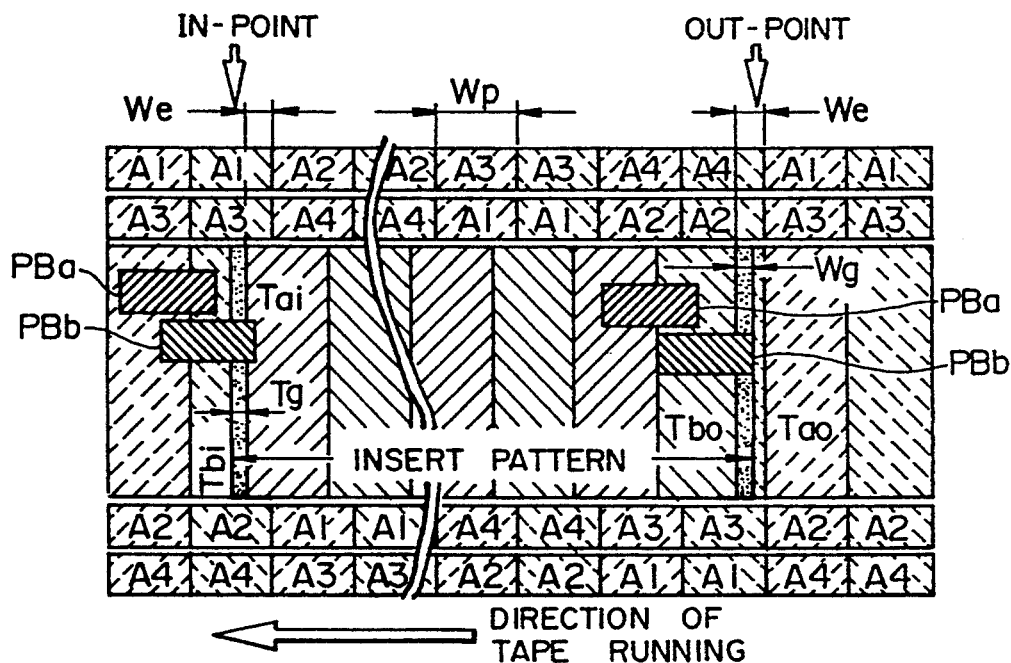

The configuration of the present embodiment heretofore described brings about an effect that the residue of erasing of the same azimuth is not reproduced at neither the in-point nor the out-point of editing as shown in FIG. 14 and hence the disturbance due to residue of erasing of the same azimuth can be prevented.

Figure 15A:
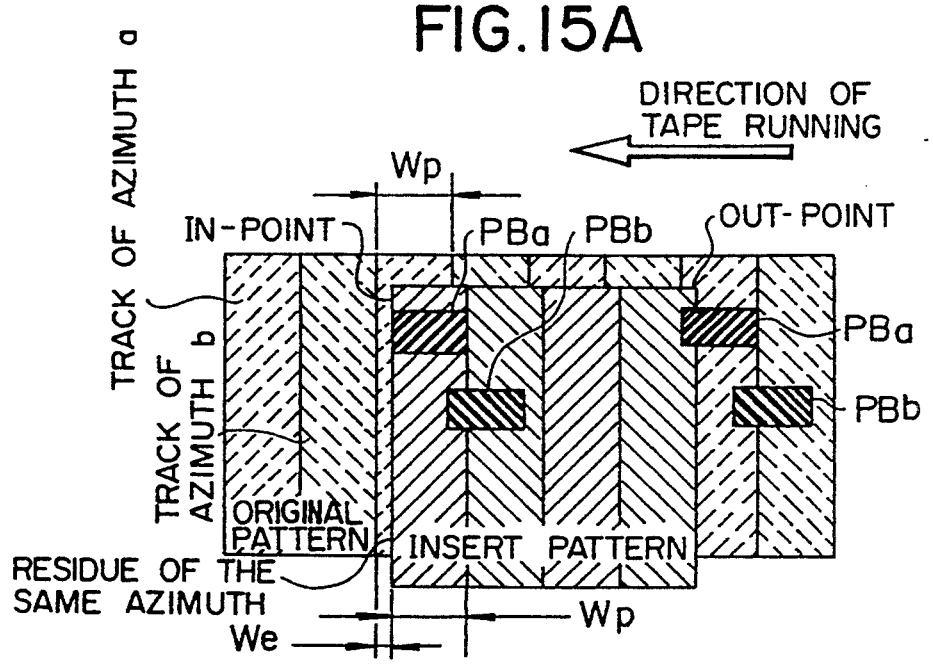
FIGS. 15A and 15B show second tape pattern diagrams in the eighth embodiment.
Figure 15B:
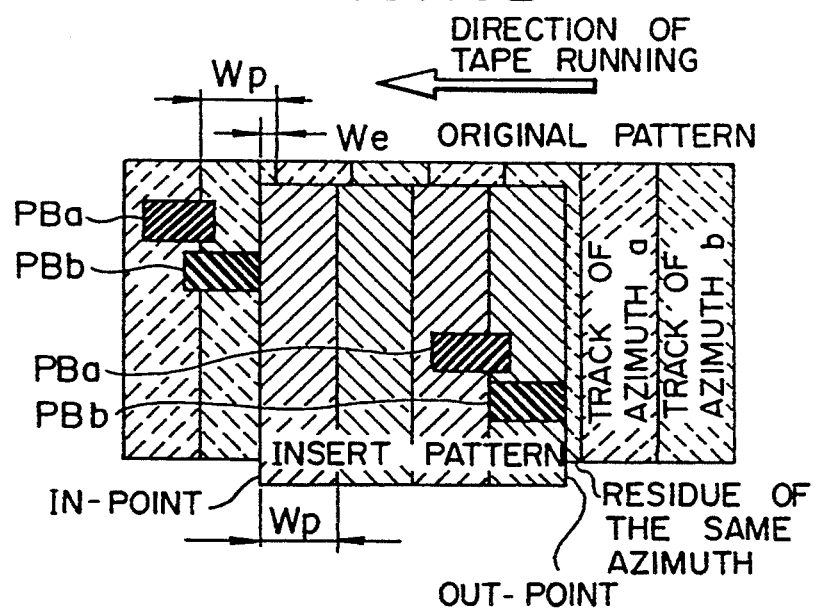

The present embodiment produces a similar effect for a tape pattern having no guards as well. In that case, it is sufficient to make the reproducing head width equivalent to the track pitch and shift each head mounting height to the center side of the paired heads by the maximum track deviation value as shown in FIG. 15.

In the present embodiment, two tracks are defined as one editing unit in the track width direction. However, more tracks may be defined as one editing unit. In that case, only reproducing heads for reproducing tracks abutting on the in-point and out-point need only be configured as in the present embodiment, and other tracks may be mere wide-width reproducing heads. That is to say, there may be used a reproducing apparatus for reproducing a magnetic recording pattern, comprising tracks so recorded by heads of at least two kinds of azimuth angles as to be alternately disposed, the above described magnetic recording pattern being recorded by handling a plurality of tracks as one recording unit at the time of recording with regard to the track width direction and forming tracks of the recording unit, and width between both ends of reproducing heads for reproducing the above described tracks of recording unit at the time of reproduction being made narrower than at least the width of the above described tracks of recording unit.

In the present embodiment, the case where an arbitrary position can be selected as the height of the reproducing head has been described. In case it is necessary to reproduce the entire track width recorded at the time of normal reproduction for detecting the height deviation of the reproducing head (i.e., deviation from the on-track) in a reproducing apparatus capable of moving the height of the reproducing head, the head arrangement of the present embodiment cannot be used as it is. However, the present embodiment can be partially executed. By extending the head width of each of reproducing paired heads to the inside of paired heads with respect to the recording track pattern by the maximum track deviation, more tracks to be originally reproduced can be reproduced, resulting in a greater resistance to disturbance due to residue of erasing of the same azimuth. As for the track of azimuth whereon residue of erasing of the same azimuth has occurred, a recording track newly recorded is deviated to the inside of pair heads and reproducing heads are shifted to the inside of paired heads. Even in the worst case, therefore, a larger amount of track which should be originally reproduced are reproduced. This is the reason for greater resistance to disturbance due to residue of erasing of the same azimuth.

As heretofore described, improvements are made upon the disturbance due to residue of erasing of the same azimuth by configuring a reproducing apparatus for reproducing a magnetic recording pattern, comprising tracks so recorded by heads of at least two kinds of azimuth angles as to be alternately disposed, the above described magnetic recording pattern being recorded by handling a plurality of tracks as one recording unit at the time of recording with regard to the track width direction and forming tracks of the recording unit, and center of each of reproducing heads located at both ends of reproducing heads for reproducing tracks of the recording unit at the time of reproduction being shifted to the inside of recording tracks as compared with the center of each recording track.

We claim:

1. A magnetic reproducing apparatus for reproducing a magnetic medium having a magnetic recording pattern recorded thereon, said magnetic recording pattern including a plurality of tracks alternately disposed with tracks respectively recorded by magnetic heads having at least two kinds of azimuth angles, said plurality of tracks being divided into a plurality of groups of tracks, each of said plurality of groups of tracks comprising a number of tracks that are aligned in a track widthwise direction and that are recorded as one recording unit by a set of recording heads, said reproducing apparatus comprising:

a rotary member; and a set of reproducing heads equal in number to the number of tracks in one of said plurality of groups of tracks forming said one recording unit, said set of reproducing heads being mounted on said rotary member such that a position of a center of each reproducing head of said set of reproducing heads located at opposite ends of said set of reproducing heads is shifted to a position inward of said set of reproducing heads with respect to a center line of a corresponding one of said number of tracks.

2. A magnetic recording and reproducing apparatus having an editing function, wherein during normal recording operation, azimuth recording is performed without forming a guard, said magnetic recording and reproducing apparatus comprising:

system control means for controlling an operating condition of said magnetic recording apparatus;

signal processing means for processing an input signal including modulation and shuffling to modify a signal form of the input signal to a form suitable for recording on a recording medium;

signal recording means including a recording amplifier and a plurality of magnetic recording heads having at least two kinds of azimuth angles for recording an output signal from said signal processing means on the recording medium, said output signal including a plurality of tracks alternately disposed, said plurality of tracks being divided into a plurality of groups of tracks, each of said plurality of groups of tracks comprising a number of tracks that are aligned in a track width direction and that are recorded as one recording unit by a set of recording heads;

track arrangement determining means for determining a portion of a previously recorded recording medium on which portion an insert recording signal section, selected by an operator or an editing controller, is to be insert-recorded, said track arrangement determining means determining the portion on the basis of a control signal from said system control means having a predetermined signal format;

guard position determining means, operative at a time of insert recording the insert recording signal section on the portion determined by said track arrangement determining means, for (i) predicting positions of leading and lagging boundaries for a set of new tracks including a plurality of new tracks to be formed after recording to said insert recording signal section, said leading and lagging boundaries (a) being defined with respect to a direction of movement of said recording medium during recording such that said leading boundary precedes said lagging boundary in the direction of movement and (b) serving to define boundaries where the set of new tracks abuts previously recorded tracks, said prediction being performed on the basis of a location of the portion on the recording medium at which said insert recording signal section is to be insert-recorded as determined by said track arrangement determining means, and (ii) determining a position of a guard to be added so that (a) the guard is not added to a position at which two of the plurality of new tracks are in abutment to each other, and (b) the guard is added (1) to a leading side of said plurality of new tracks facing the leading boundary or (2) to each of both leading and lagging sides of said plurality of new tracks respectively facing the leading and lagging boundaries; and guard adding means for adding the guard to the recording medium at the position determined by said guard position determining means;

said magnetic recording and reproducing apparatus further comprising:

a rotary member; and a set of reproducing heads equal in number to the number of tracks in one of said plurality of groups of tracks forming said one recording unit, said set of reproducing heads being mounted on said rotary member such that a position of a center of each reproducing head of said set of reproducing heads located at opposite ends of said set of reproducing heads is shifted to a position inward of said set of reproducing heads with respect to a center line of a corresponding one of said number of tracks.

* * * * *